(12) United States Patent
Bhattad et al.

(10) Patent No.: US 11,778,661 B2
(45) Date of Patent: Oct. 3, 2023

(54) TECHNIQUES FOR DETERMINING CONTENTION WINDOW UPDATE

(71) Applicant: QUALCOMM Incorporated, San Diego, CA (US)

(72) Inventors: Kapil Bhattad, Bangalore (IN); Xiaoxia Zhang, San Diego, CA (US); Jing Sun, San Diego, CA (US); Pravjyot Singh Deogun, Bengaluru (IN)

(73) Assignee: QUALCOMM Incorporated, San Diego, CA (US)

( * ) Notice: Subject to any disclaimer, the term of this patent is extended or adjusted under 35 U.S.C. 154(b) by 116 days.

(21) Appl. No.: 16/903,226

(22) Filed: Jun. 16, 2020

(65) Prior Publication Data

US 2021/0037567 A1 Feb. 4, 2021

(30) Foreign Application Priority Data

Aug. 1, 2019 (IN) .............................. 201941031137

(51) Int. Cl.
*H04W 4/00* (2018.01)
*H04W 74/08* (2009.01)
(Continued)

(52) U.S. Cl.
CPC ....... *H04W 74/0808* (2013.01); *H04L 5/0055* (2013.01); *H04L 5/0094* (2013.01);
(Continued)

(58) Field of Classification Search
CPC ........... H04W 74/0808; H04W 72/042; H04W 72/0446; H04W 88/06; H04L 5/0055; H04L 5/0094
See application file for complete search history.

(56) References Cited

U.S. PATENT DOCUMENTS 10,693,615 B2 * 6/2020 Oh ........................ H04L 5/0055
2020/0084767 A1 * 3/2020 Wolff ................ H04W 72/0446
(Continued)

FOREIGN PATENT DOCUMENTS

WO  2019022519 A1  1/2019

OTHER PUBLICATIONS

3GPP TSG-RAN WG1 Meeting #97, "Channel access procedures", May 13-17, 2019, R1-1907454 (Year: 2019).*
(Continued)

*Primary Examiner* — Siren Wei
(74) *Attorney, Agent, or Firm* — Procopio, Cory, Hargreaves & Savitch LLP

(57) ABSTRACT

Techniques for defining a reference duration and one or more reference transmissions that are utilized for contention window update are provided to address these new features. An apparatus, such as a wireless device, determines a reference duration of a channel occupancy time (COT), the reference duration based at least in part on a subcarrier spacing (SCS) and based on reception of a physical downlink shared channel (PDSCH) transmission. The apparatus updates a contention window (CW) based at least in part on reception of the PDSCH transmission during the reference duration. For example, the apparatus may increase the CW when a negative acknowledgement (NACK) is received for the determined PDSCH in the COT and may assign CW with a predetermined minimum value (CW_min) when a positive acknowledgement (ACK) is received for the determined PDSCH.

26 Claims, 16 Drawing Sheets

(51) Int. Cl.
  *H04L 5/00* (2006.01)
  *H04W 88/06* (2009.01)
  *H04W 72/0446* (2023.01)
  *H04W 72/23* (2023.01)
(52) U.S. Cl.
  CPC ....... *H04W 72/0446* (2013.01); *H04W 72/23* (2023.01); *H04W 88/06* (2013.01)

(56) References Cited

U.S. PATENT DOCUMENTS

2020/0100286 A1* 3/2020 Xu ................... H04W 72/0446
2021/0022129 A1* 1/2021 Yuan ................... H04L 5/0057

OTHER PUBLICATIONS

Ericsson: "Channel Access Procedures", 3GPP TSG-RAN WG1 Meeting #97, 3GPP Draft, R1-1907454 Channel Access Procedures, 3rd Generation Partnership Project (3GPP), Mobile Competence Centre, 650, Route Des Lucioles, F-06921 Sophia-Antipolis Cedex, France, vol. RAN WG1, No. Reno, NV, USA, May 13, 2019-May 17, 2019, pp. 1-7, May 13, 2019 (May 13, 2019), XP051728885, Retrieved from the Internet: URL: http://www.3gpp.org/ftp/Meetings%5F3GPP%5FSYNC/RAN1/Docs/R1%2D1907454%2Ezip [retrieved on May 13, 2019] sections 2.5.1, 2.5.2.

Huawei, et al., "Coexistence and Channel Access for NR Unlicensed Band Operations", 3GPP Draft, 3GPP TSG RAN WG1 Ad-Hoc Meeting 1901, R1-1900060, Mobile Competence Centre, vol. RAN WG1, No. Taipei, Jan. 21, 2019-Jan. 25, 2019, Jan. 11, 2019, XP051575686, Jan. 20, 2019, 16 Pages, Retrieved from Internet: URL: http://www.3gpp.org/ftp/tsg%5Fran/WG1%5FRL1/TSGR1%5FAH/NR%5FAH%5F1901/Docs/R1%2D1900060%2Ezip, [retrieved Jan. 11, 2019], figures 1(a), 1(b), section 2.2, 2.3, [retrieved Jan. 20, 2019], sections: 2.1.1, 2.1.2, 2.3, 2.6, 2.7.

International Search Report and Written Opinion—PCT/US2020/038220—ISA/EPO—dated Oct. 1, 2020.

* cited by examiner

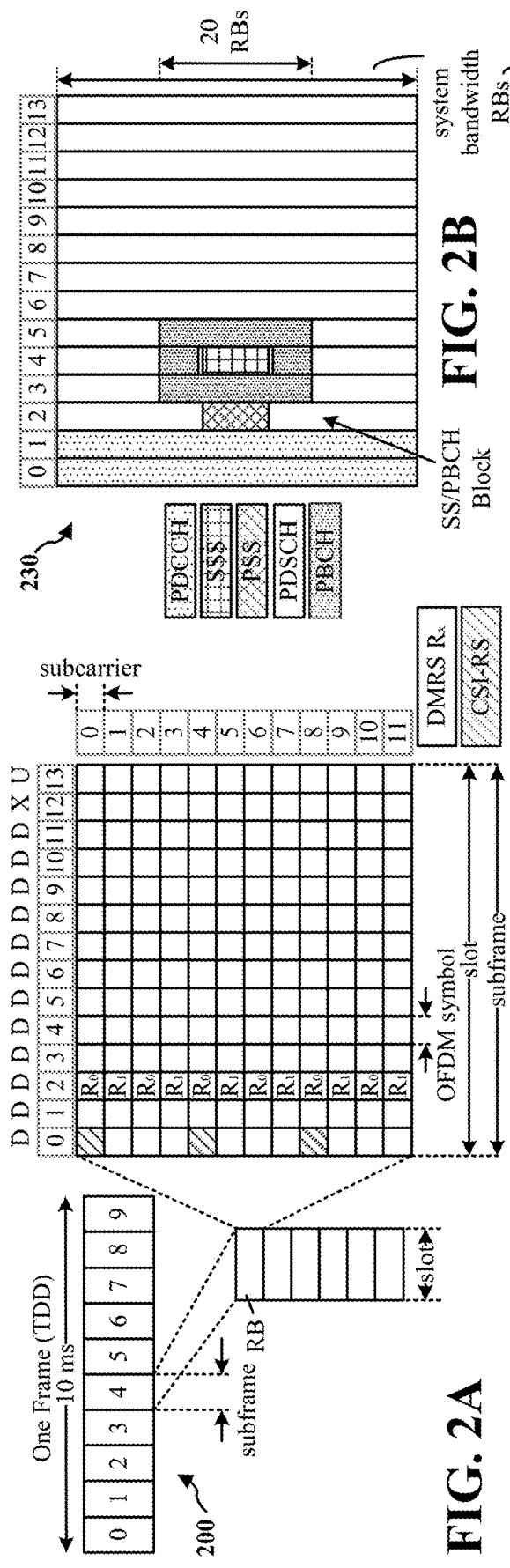
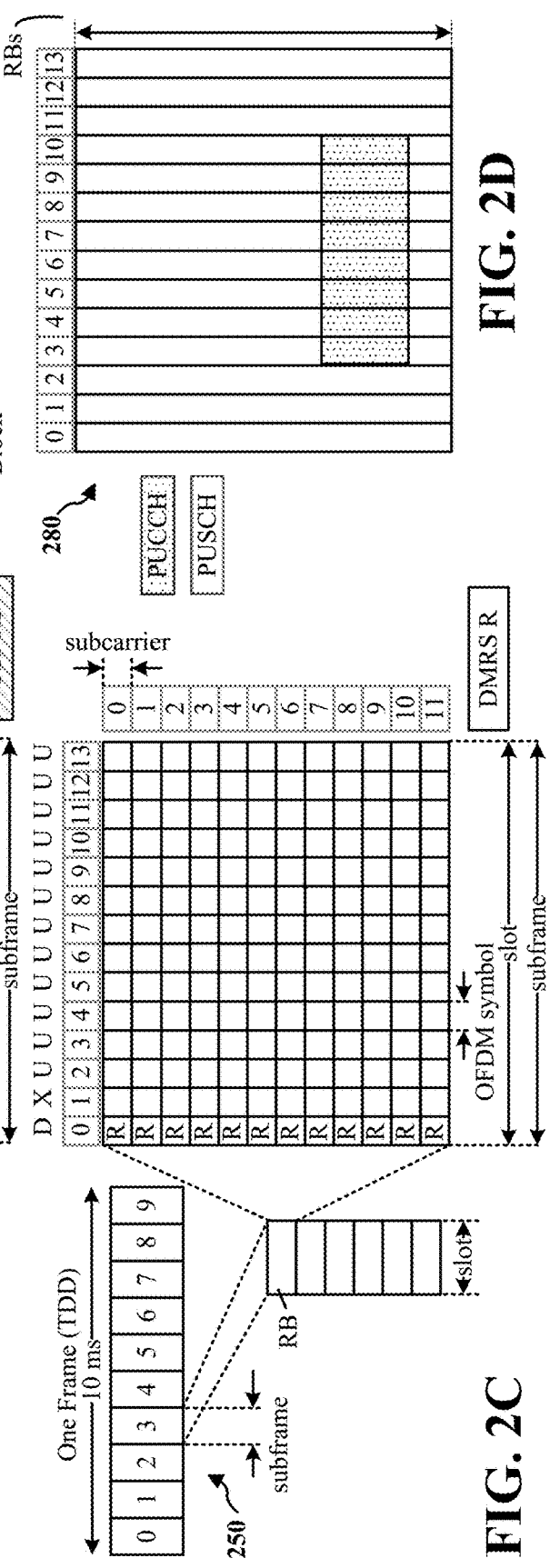
FIG. 2A
FIG. 2B
FIG. 2C
FIG. 2D

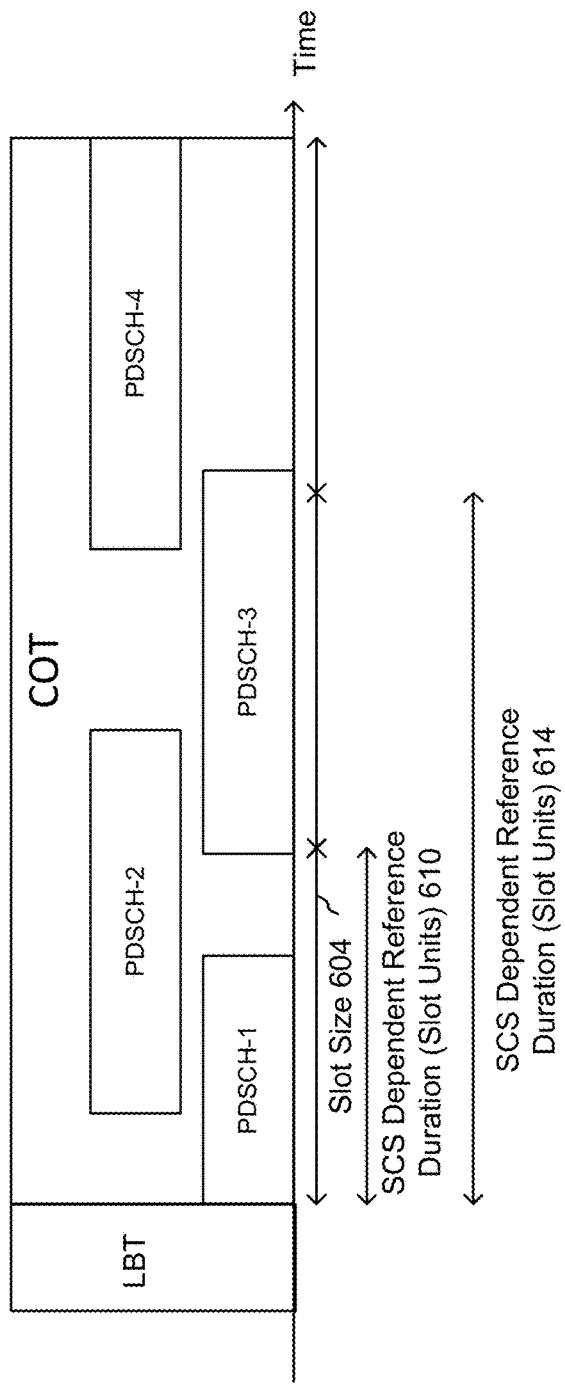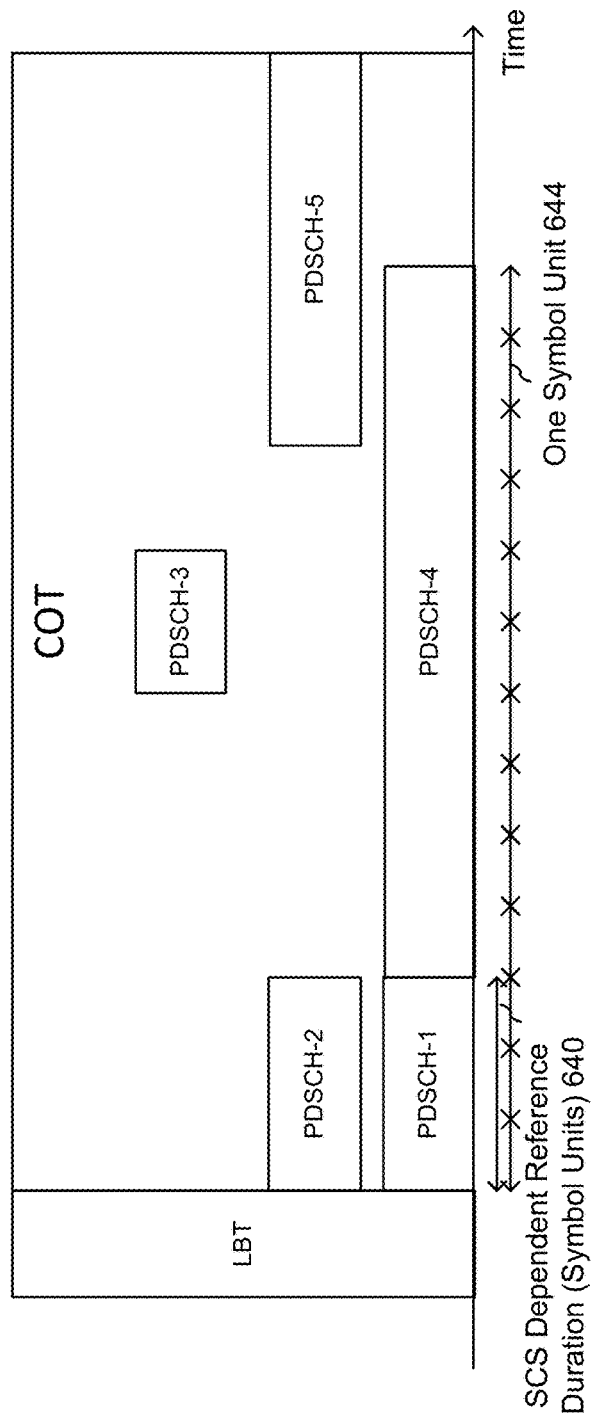

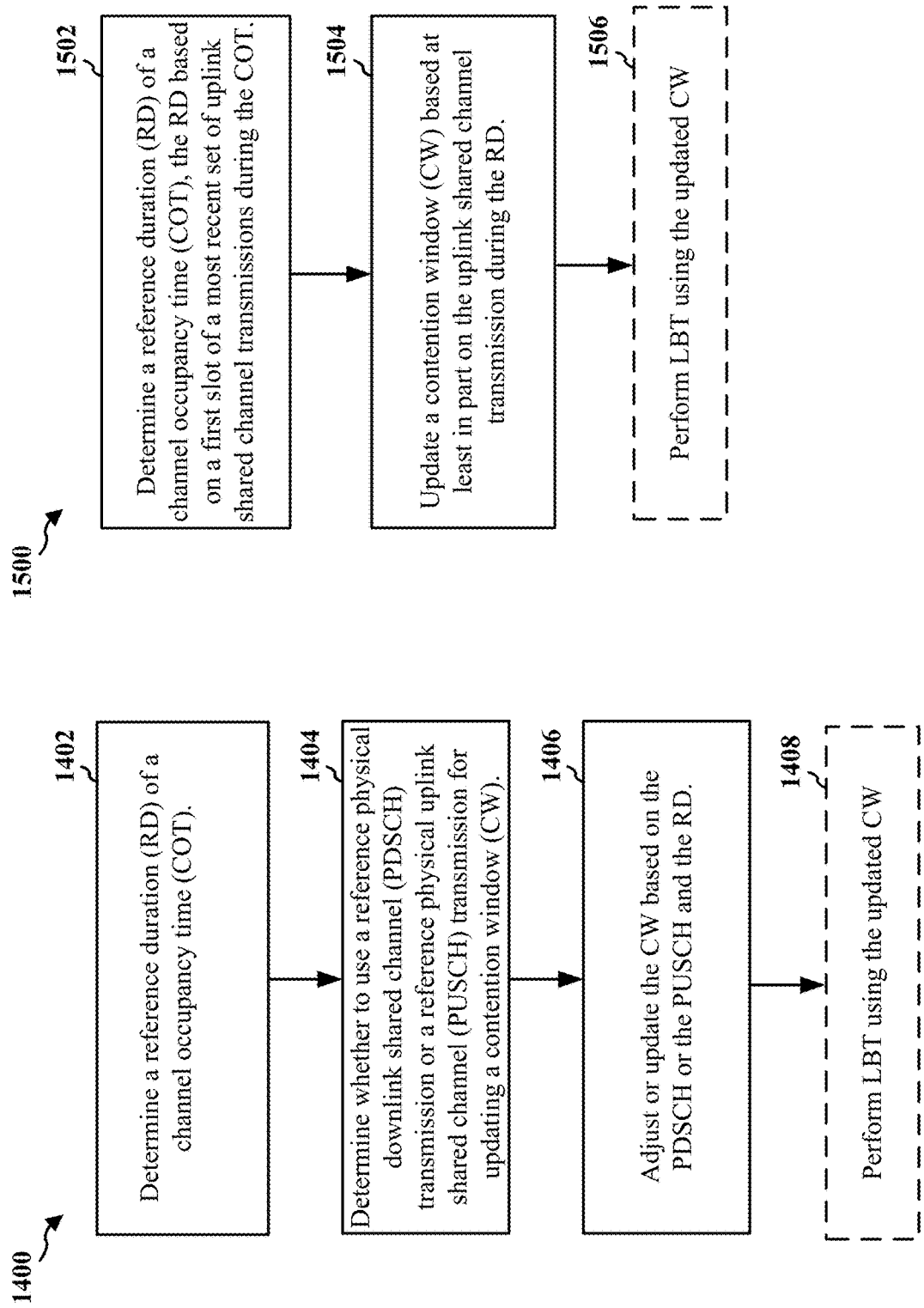

TECHNIQUES FOR DETERMINING CONTENTION WINDOW UPDATE

CROSS REFERENCE TO RELATED APPLICATION

This application claims the benefit of Indian Application Serial No. 201941031137, entitled "Techniques for Determining Contention Window Update" and filed on Aug. 1, 2019, which is expressly incorporated by reference herein in its entirety.

BACKGROUND

Technical Field

The present disclosure relates generally to communication systems, and more particularly, to techniques for determining wireless communication including a contention window.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low-latency communications (URLLC).

Licensed Assisted Access (LAA) brings together licensed spectrum and un-licensed spectrum to create higher capacity than can be offered by licensed spectrum alone. Increasing network capacity is vital in addressing the exponential growth of data traffic in cellular networks. LAA in 5G new radio, unlicensed (NR-U) has new requirements and features.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Techniques are provided relating to contention window (CW) adjustment or update.

A user equipment (UE) may be configured to implement one or more techniques for determining reference transmissions for CW update or adjustment. The UE may employ such determination techniques to determine one or more uplink reference transmissions for use in adjusting or updating the UE's CW. The techniques for determining the reference transmission may include directly determining the reference transmission or may include determining the reference transmission by first determining a reference duration and then determining the reference transmission based at least in part on the determined reference duration.

A base station may be configured to implement one or more techniques for determining reference transmissions for CW update or adjustment. Specifically, the base station may employ reference transmission determination techniques to determine one or more downlink reference transmissions for use in adjusting or updating the base station's CW. The techniques for determining the reference transmission may directly determine the reference transmission or may determine the reference transmission by first determining a reference duration and then determining the reference transmission based at least in part on the determined reference duration.

Once the reference signal is determined, the transmitting node may monitor the success or failure of the transmitted reference signal (e.g., ACKs or NACKs sent by the receiving node). The transmitting node may then use the success or failure of a receiving node to receive the transmitted reference signal to selectively adjust the transmitting node's CW.

In an aspect of the disclosure, a method, a computer-readable medium, and an apparatus are provided for wireless communication. The apparatus may determine a reference duration of a channel occupancy time (COT), the reference duration based at least in part on a subcarrier spacing (SCS) and based on reception of a physical downlink shared channel (PDSCH) transmission. The apparatus may updates a CW based at least in part on reception of the PDSCH transmission during the reference duration.

In another aspect of the disclosure, a method, a computer-readable medium, and an apparatus are provided for wireless communication at a base station. The base station may determine a reference duration of a COT, the reference duration being based at least in part on a SCS. The base station may further determine at least one reference physical downlink control channel (PDCCH) transmission transmitted during the reference duration. The base station may further update a CW based at least in part on an uplink transmission having the at least one reference PDCCH transmission transmitted during the reference duration.

In another aspect of the disclosure, a method, a computer-readable medium, and an apparatus are provided for wireless communication at a base station. The base station may determine a reference duration of a COT. The base station may further determine whether to use a reference PDSCH transmission or a reference physical uplink shared channel (PUSCH) transmission for updating a CW. The base station may further update the CW based on the PDSCH or the reference PUSCH transmission and the reference duration.

In another aspect of the disclosure, a method, a computer-readable medium, and an apparatus are provided for wireless communication at a UE. The UE may determine a reference duration of a COT based on a first slot of a most recent set of uplink shared channel transmissions during the COT. The UE may update a CW based at least in part on the uplink shared channel transmission during the reference duration. The uplink shared channel transmissions may include non-contiguous uplink shared channel transmissions, for example. The CW may be updated further based on a downlink transmission during the COT, for example.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 6A illustrates a technique for determining a reference duration in slot units according to one example.

FIG. 6B illustrates a technique for determining a reference duration in symbol units scheduling according to another example.

FIG. 14 is a flowchart of a method of wireless communication according to a third example.

FIG. 15 is a flowchart of a method of wireless communication according to a fourth example.

DETAILED DESCRIPTION

Figure 1:
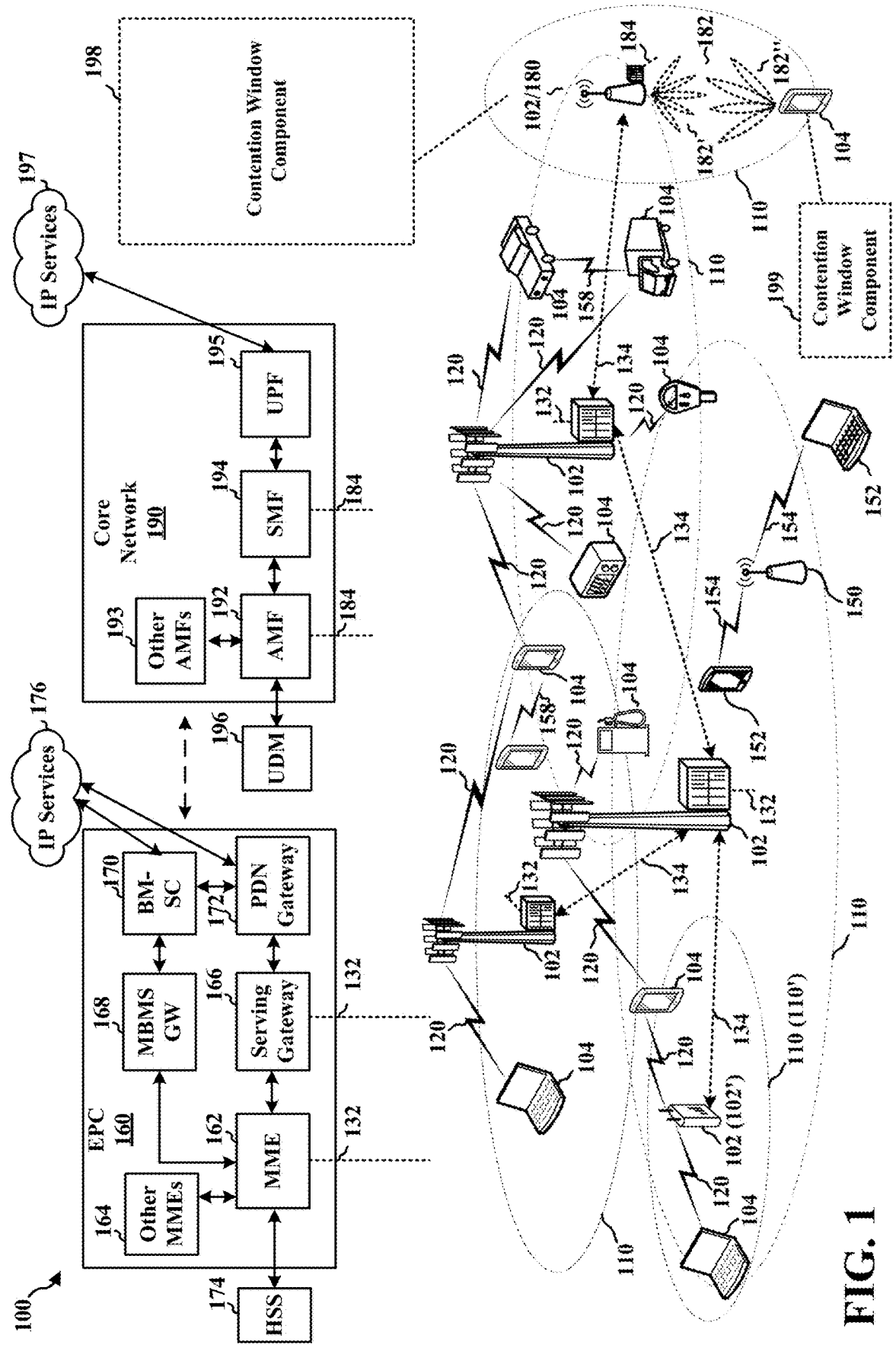
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, evolved Node B (eNB), an access point, a base transceiver station, a radio base station, a radio transceiver, a transceiver function, a basic service set (BSS), an extended service set (ES S), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may comprise a contention window component 199 configured to implement one or more techniques for determining a CW update/adjustment, which may include determining a reference transmission for determining the CW update. Referring again to FIG. 1, in other aspects, a base station 102/180 may comprise a contention window component 198 configured to determine a CW update or adjustment, e.g., which may include determination of a reference transmission for determining the CW update.

These reference transmission determination techniques that may be employed by the contention window components 198, 199, and which are described in greater detail hereinafter, enable a determination of which transmitted signals to use to make a CW update or adjustment. These techniques may be especially important to support the adjustment and update of a CW at either the UE 104 or the base station 102/180. Although the following description may be focused on 5G NR, the techniques and concepts described herein may be applicable to other similar areas, such as LTE, LTE-A, and other wireless technologies, where a UE 104 or base station 102 needs to determine CW adjustments.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies µ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology µ, there are 14 symbols/slot and 2µ slots/subframe. The subcarrier spacing and symbol length/duration are a function of the numerology. The subcarrier spacing may be equal to $2^{\mu}*15$ kHz, where µ is the numerology 0 to 5. As such, the numerology µ=0 has a subcarrier spacing of 15 kHz and the numerology µ=5 has a subcarrier spacing of 480 kHz. The symbol length/duration is inversely related to the subcarrier spacing. FIGS. 2A-2D provide an example of slot configuration 0 with 14 symbols per slot and numerology µ=0 with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (B SR), a power headroom report (PHR), and/or UCI.

Figure 3:
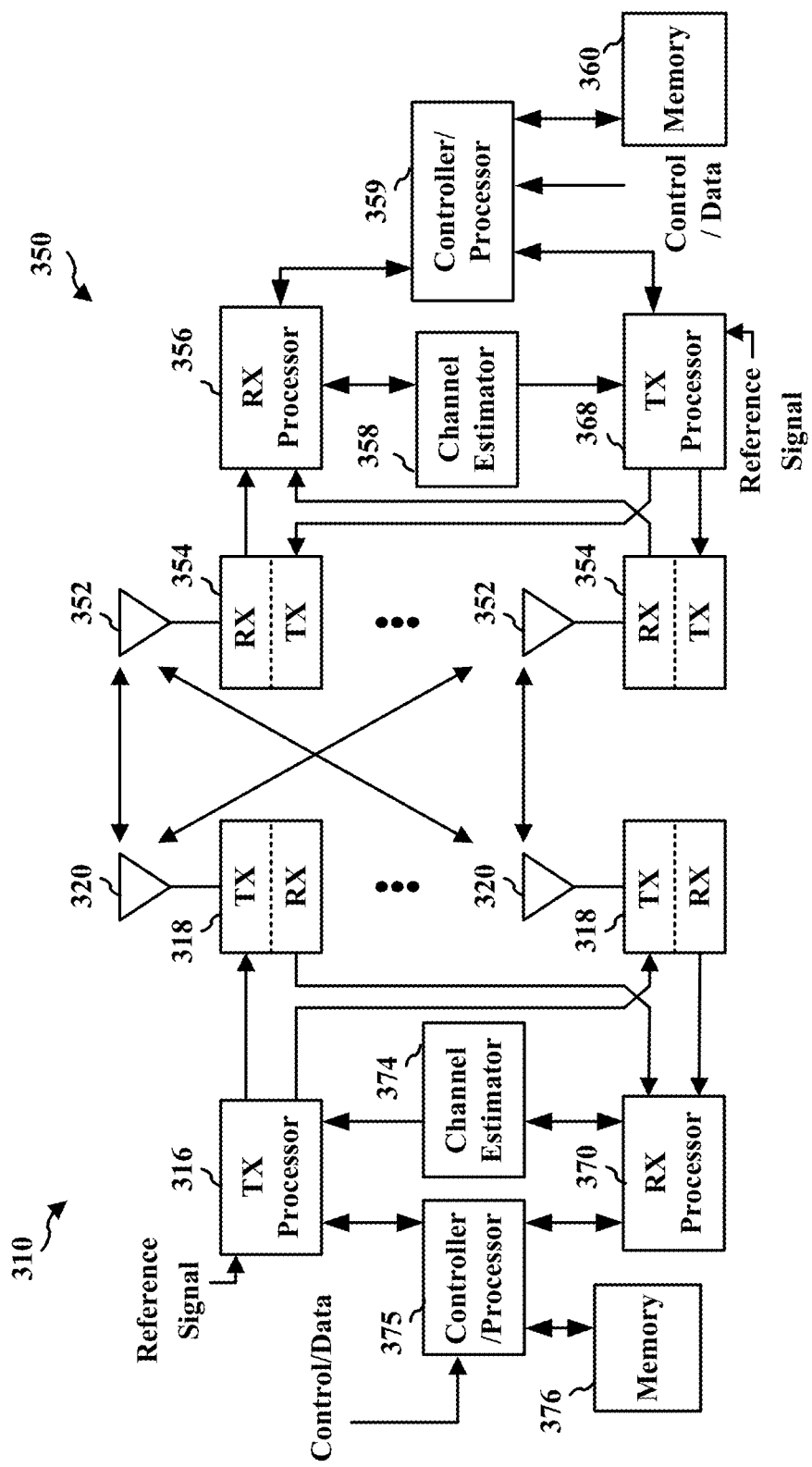
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/ demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 316, the RX processor 370, and the controller/processor 375 may be configured to perform aspects in connection with techniques for determining reference signals for CW update and may include contention window component 198 of FIG. 1. Similarly, at least one of the TX processor 368, the RX processor 356, and the controller/processor 359 may be configured to perform aspects in connection with techniques for determining reference signals for CW update and may include contention window component 199 of FIG. 1.

Spectrum sharing provides access to shared and unlicensed spectrums that provide the benefits of higher capacity, higher spectrum utilization, and new deployments. These deployments may include licensed spectrum aggregation that enables enhanced mobile broadband with higher speeds and better user experiences; private networks that provide enterprise services, such as industrial IoT applications; or enhanced local broadband that enable host networks, such as for sports and entertainment venues. For example, LAA brings together use of the licensed spectrum and the unlicensed spectrum to create higher capacity than can be offered by the licensed spectrum alone.

Prior to gaining access to, and communicating over, a contention-based shared radio frequency spectrum band, a base station or UE may perform a listen before talk (LBT) procedure to contend for access to the shared radio frequency spectrum band. An LBT procedure may include performing a CCA procedure to determine whether a channel of the contention-based shared radio frequency spectrum band is available. When it is determined that the channel of the contention-based shared radio frequency spectrum band is available, a wireless device may transmit a channel reserving signal, such as a channel usage beacon signal (CUBS) to reserve the channel. A CCA procedure used by the wireless device to check before using a particular channel may be based on energy detection. The wireless device may perform energy detection to detect the presence or absence of other signals on the channel in order to determine whether the channel is occupied or clear. A duration for performing the CCA may be based on a CW size, a random backoff, an energy detection threshold, etc. For LAA, the wireless device may employ a LBT procedure. LBT, which may also be known as listen before transmit, is a technique used by a transmitter to first sense the radio environment before starting transmission. The wireless device may use a contention window (CW) to initiate the LBT procedure, such as Cat. 4 LBT procedure. The CW may be a positive integer that indicates a length of time for the UE sense the radio environment. A longer CW may result in a higher backoff by the wireless device. The CW may be adjusted based on network conditions. When the network is congested, a transmitting device receives NACKs or does not receive any acknowledgements in response to a transmission. In response to receiving negative feedback or to failing to receive feedback, the device may increase the CW, e.g., by doubling the CW size, multiplying a factor or adding an offset, etc. When the network is less congested, as indicated by the transmitting device receiving an ACK, the device may decrease the CW (e.g., reset to a minimum value).

Thus, some aspects of updating a CW of a transmitting device may be based on the success or failure of a reference transmission being received by a receiving device. The transmitting device may identify a reference transmission as a transmission signal sent during a reference slot of a COT. For example, the reference slot may be a first valid slot of the COT. As Wi-Fi device may transmit a request to send (RTS)/clear to send (CTS) and stop, utilization of an early part of the COT to determine a CW update may provide for a more accurate LBT procedure. The reference slot may be, for example, a first slot in the COT or a first partial slot (in the case of a punctured transmission) and a subsequent slot in the COT. The CW may be adjusted based at least in part on a first slot in the COT or a partial slot and a subsequent slot in the COT for punctured transmissions.

However, a slot size may be different based on a different Subcarrier Spacing (SCS). For a 15 kHz SCS, a slot has a duration of 1 ms. For a 30 kHz SCS, a slot has a duration of 0.5 ms. For example, in NR-U communication, different SCS may be used for communication. Also, for a given SCS, the durations of downlink transmissions may be different (e.g., the durations of PDSCH transmissions may be different and some PDSCHs may only span a few symbols of a slot). Some techniques, described below, take into account these considerations in determining RD and reference transmission for use in CW adjustment.

Furthermore, even if a PDSCH transmission is punctured, Code Block Group (CBG) based feedback may be available. Some techniques, described below, take advantage of the CBG based feedback so that a reference duration may include less than a full slot subsequent to a partial slot.

CW Size Adjustment Techniques for UE and Base Station

Figure 4:
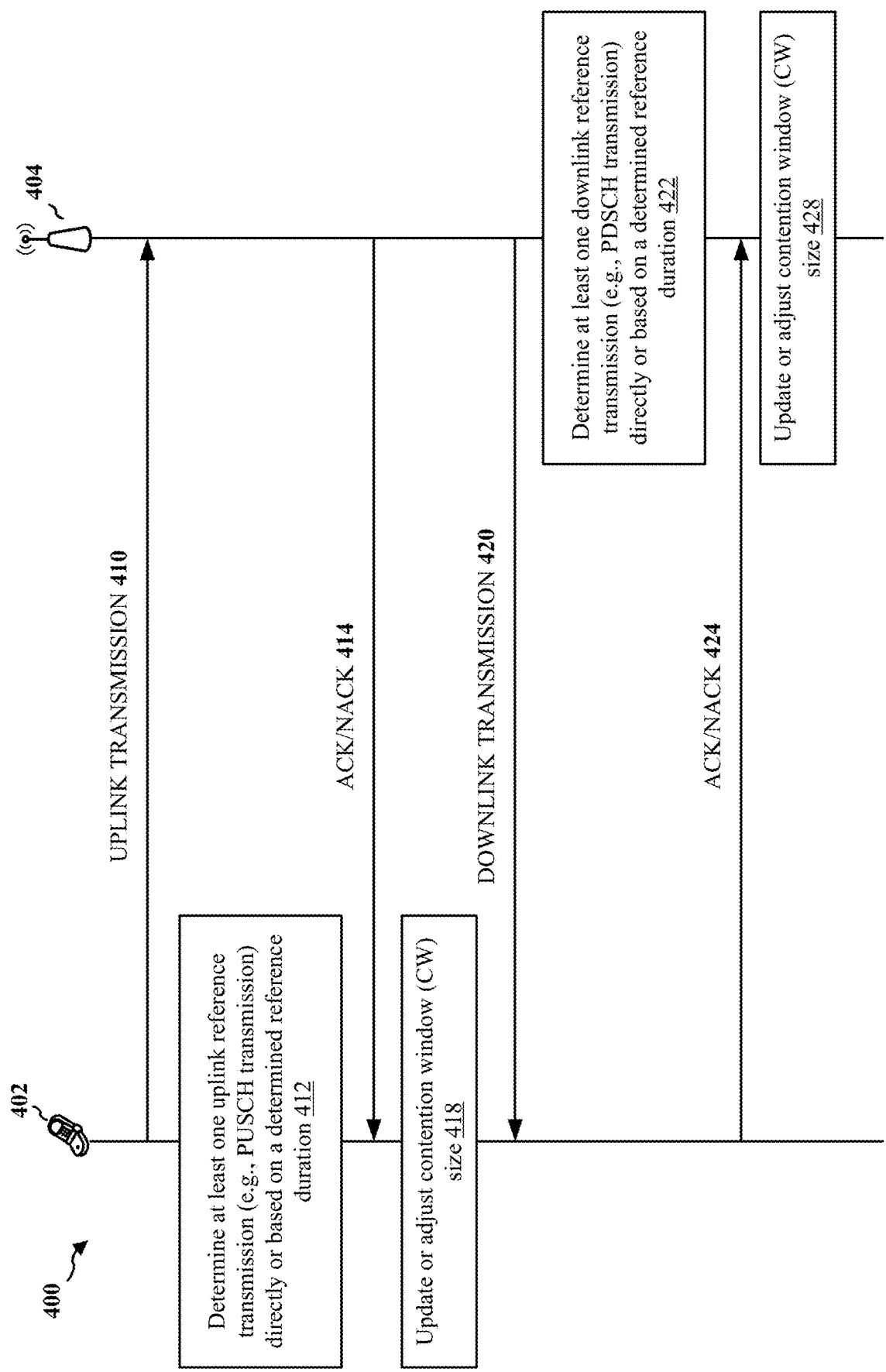
FIG. 4 illustrates a call flow that uses contention window (CW) size adjustment techniques according to some implementations.

FIG. 4 illustrates a call flow 400 that uses CW size adjustment techniques (e.g., 412, 418, 422 and 428) according to some implementations. A UE 402 may employ CW size adjustment techniques (e.g., 412 and 418) to adjust or update its CW size or value. In 410, the UE 402 sends one or more uplink transmissions in a transmit opportunity (TxOp) to the base station 404. The uplink transmissions may be, for example, PUCCH or PUSCH transmissions. In block 412, the UE 402 determines at least one uplink reference transmission directly or based on a determined RD. In block 418, the UE 402 updates or adjusts its CW size based on one or more ACK/NACK feedback of the reference transmission, which are sent by the base station 404 and received by the UE 402 in 414.

Similarly, the base station 404 may employ CW size adjustment techniques (e.g., 422 and 428) to adjust or update its CW size or value. In 420, the base station 404 may send one or more downlink transmissions in a TxOp to the UE 402. The downlink transmissions may be, for example, PDCCH or PDSCH transmissions. In block 422, the base station 404 determines at least one downlink reference transmission directly or based on a determined RD. In block 428, the base station 404 updates or adjusts its CW size based on one or more ACK/NACK feedback of the reference transmission, which are sent by UE 402 and received by the base station 404 in 424.

Figure 5:
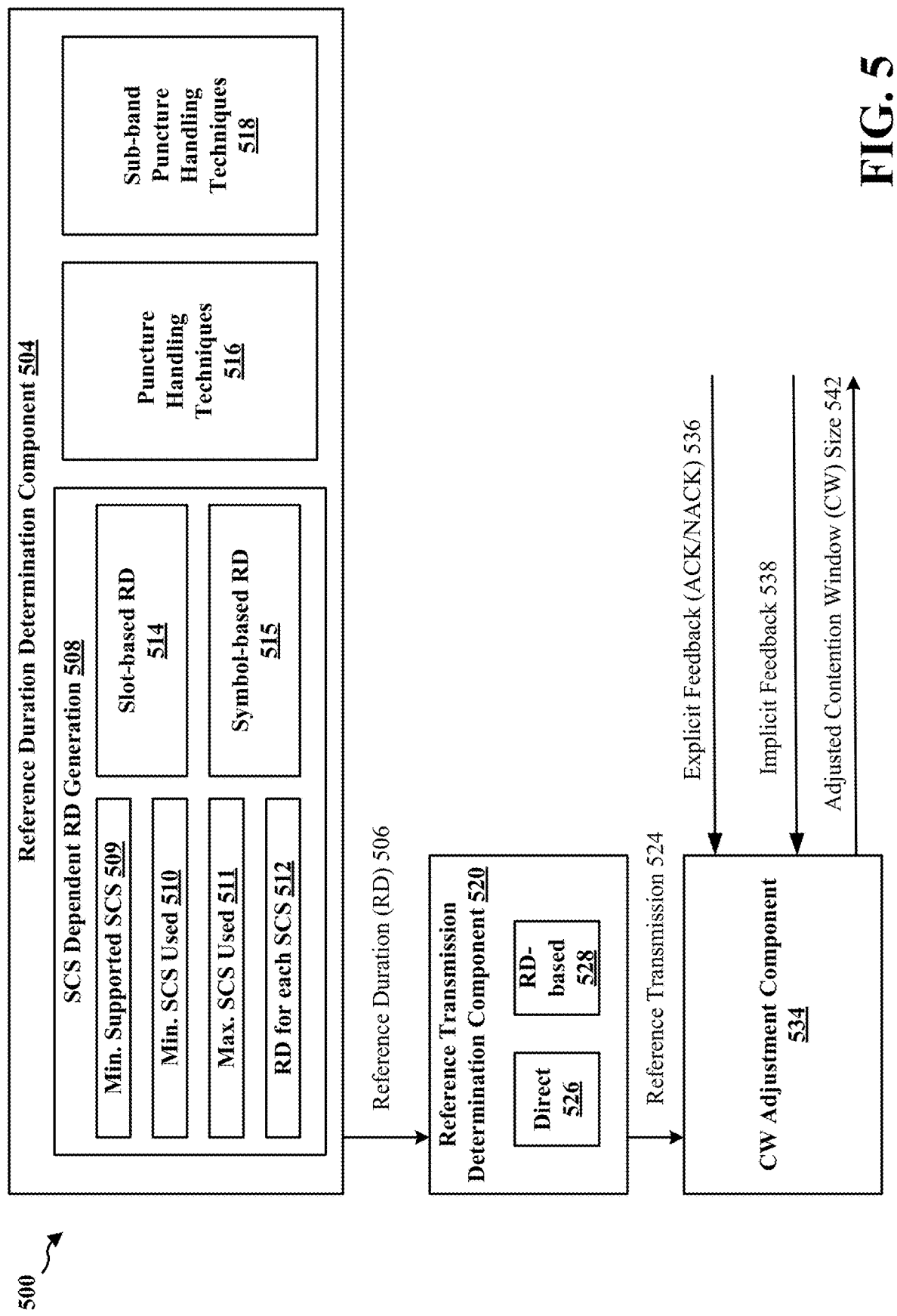
FIG. 5 illustrates various techniques for determining reference duration (RD), reference signals, and CW size according to some implementations.

FIG. 5 illustrates various techniques 500 for determining an RD, reference transmissions, and a CW size according to some implementations. An RD determination component 504 may include an SCS dependent RD generator 508 that generates an RD 506 that is dependent on SCS. The SCS dependent RD generator 508 may also include slot-based RD determination techniques 514 and symbol-based RD determination techniques 518. Slot-based RD determination techniques 514 are described in greater detail below with reference to FIG. 6A, and symbol-based RD determination techniques 518 are described in greater detail below with reference to FIG. 6B.

The RD determination component 504 may also include puncture handling techniques 516 for selectively extending RD when one or more transmissions are punctured and sub-band puncture handling techniques 518 for selectively extending RD when one or more transmissions are punctured in time and frequency. Puncture handling techniques 516 are described in greater detail below with reference to FIGS. 8A-8B. Sub-band puncture handling techniques 518 are described in greater detail below with reference to FIGS. 9A-9B.

Slot-Based Reference Duration

Referring to FIG. 6A, one or more slot-based RD techniques 514 may be utilized to generate an RD 506 that is based on a number of slots (e.g., an RD having a duration in units of slots). In one example, the RD 506 may be based on a minimum supported SCS. As an example, the RD may be predefined based on a minimum supported SCS (e.g., an RD of 1 ms may be used if a minimum supported SCS is 15 kHz). An RD may be based on a minimum SCS supported by the transmitting device. For example, if a base station supports a minimum SCS of 15 kHz, then the base station may use an RD of 1 ms. If the base station supports a minimum SCS of 30 kHz, then the base station may use an RD of 0.5 ms. If the base station supports a minimum SCS of 60 kHz, then the base station may use an RD of 0.25 ms. If the base station supports a minimum SCS of 120 kHz, then the base station may use an RD of 0.125 ms. If the base station supports a minimum SCS of 240 kHz, then the base station may use an RD of 0.0625 ms. FIG. 6A illustrates an example slot size 604 and two different RDs 610 and 614 based on different reference SCS sizes. FIG. 6B also illustrates an example symbol size 644 and a size of an RD 640 that has a duration that is based on a reference SCS. In FIG. 6A, the duration of the RD is based on a slot size, e.g., a number of slots. In FIG. 6B, the duration of the RB has a duration based symbol units, e.g., one or more symbols in length. Thus, in FIG. 6A, the RD may have a size of a particular number of slots, and in FIG. 6B, the RD may have a size of a particular number of symbols. Although aspects are described using the example of a base station, this is merely illustrative of the concept. Aspects may be similarly applied by a UE.

In a second example, the RD 506 may be determined as a function of a minimum SCS actually used (e.g., 510) at beginning of COT. For example, if a base station uses a 15 kHz SCS for a transmission at the beginning of COT, then the base station may use an RD of 1 ms. Otherwise, if the base station uses a 30 kHz SCS, then the base station may use an RD 506 of 0.5 ms. Alternatively, an RD may be based on a maximum SCS used by the transmitting device (e.g., at 511) at the beginning of the COT. For example, if a base station uses a maximum SCS of 30 kHz, then the base station may use an RD of 0.5 ms, and so forth.

The RD may be different for different SCS so that, for CW adjustments, a PDSCH of a particular SCS is considered that are within a duration corresponding to that SCS without considering PDSCH of a different SCS. The RD Determination Component 520 may use any of various techniques 512 for determining different reference durations for each SCS. For example, techniques 512 may be utilized to determine separate RDs that are SCS specific so that PDSCHs of a particular SCS may be included within the duration corresponding to that SCS. For example, all 15 kHz PDSCHs, which are transmitted during a first 1 ms of a COT, and all 30 kHz PDSCHs that are transmitted during a first 0.5 ms of a COT may be considered for the CW update.

In one example, the RD may be based on a maximum of the RD values determined by using any of the above-described techniques. In another example, a lower bound (e.g., a minimum RD value) may be applied to the result of the maximum function so that the RD may not be lower than a predetermined value. For example, the lower bound may be a duration of 0.5 ms or some other predetermined value.

Symbol-Based RD

Although aspects are described using the example of a base station, this is merely illustrative of the concept. Aspects may be similarly applied by a UE. When the transmitted PDSCHs in the first slot do not occupy all the symbols, the base station may determine an RD based on a partial slot, e.g., based on symbols. Such scheduling may also be referred to herein as sub-slot scheduling. For example, the RD can extend from the beginning of the first slot to the symbol of the PDSCH that ends earliest. For example, consider three PDSCHs, a first PDSCH from S1-S3 (S=Symbol), another PDSCH from S4-S13, and another PDSCH from S1 to S13. In this case, the base station may determine the RD to be S1-S3 because the first PDSCH ends earliest in the first slot.

In another example, the first slot may have one PDSCH from S1 to S13, and another PDSCH from S7-S8. According to a first example, the base station may determine the RD based on the earliest ending PDSCH without considering where the PDSCH started in the COT. Thus, the base station may determine the RD to extend from S1 to S8.

According to a second example, the base station may determine the RD based on an earliest ending PDSCH and also considering whether PDSCHs that start early in TxOP or have a PDCCH that starts early in TxOP. The term, "early," may be defined as starting within a first X symbols or X ms of the COT. X may correspond to an integer value so that X symbols corresponds to a number of symbols. In this case, using the same example as above, the base station may determine RD to be from S1 to S13, because the PDSCH from S1 to S13 starts early in the COT. When a PDSCH is sent with multiple SCS, the RD determination techniques may be applied independently per SCS, so that there are some PDSCHs for each SCS. An RD may be determined based on a maximum or a minimum of the RD determined across all SCSs. The RD may be determined and applied per SCS. Thus, for multiple SCS, the base station may determine and apply multiple RDs.

The RD determination techniques described previously may also be applied at a CBG level when CBG based feedback/transmission is used. Thus, the RD may be based on an earliest ending first CBG of a PDSCH or based on first CBG of a PDSCH that starts early in the TxOP. When there are two PDSCHs such that a first PDSCH's first CBG occurs from slots S1-S2, and a second PDSCH's first CBG occurs from slots S1-S4, then duration may be determined as slots S1-S2 because the first PDSCHs first CBG ends earliest. The RD may be based on a first CBG of a PDSCH that starts within a certain time period with reference to the beginning of the COT. If multiple CBGs are sent with multiple SCS, the RD may be determined per SCS or may be determined independent of SCS. Thus, a first CBG of the PDSCHs may be used for each SCS. The duration may be determined based on a maximum of RDs determined using different techniques or based on a minimum of RDs determined using different techniques.

Thus, a base station may determine an RD based on a maximum value of the RDs determined with any of the techniques described herein. In yet another example, the determined value may have a lower bound so that RD may not be less than a predetermined minimum value, such as 0.25 ms.

The reference transmission determination component 520 may apply any of various techniques to determine a reference transmission 524. Component 520 may determine a reference transmission based on RD, for example. In one example, component 520 may determine which PDSCH(s) to use as reference PDSCH(s) for determining a CW update.

Figure 7A:
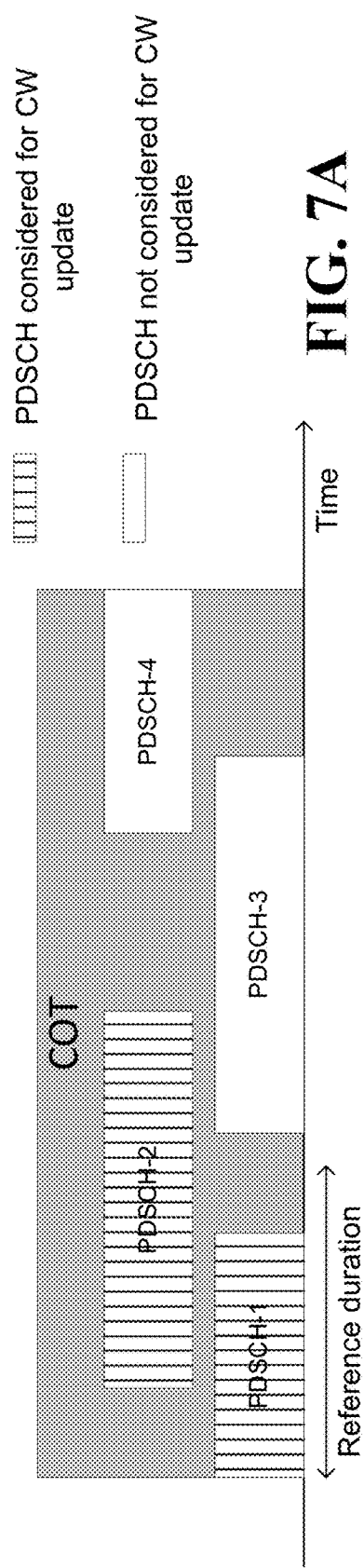
FIG. 7A illustrates a technique for determining a reference signal based at least in part on a reference duration and a starting point of the reference signal according to one example.
Figure 7B:
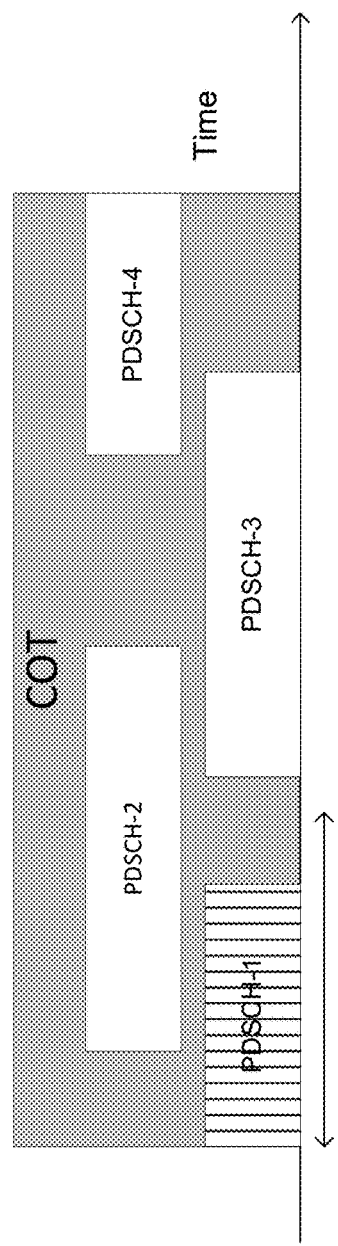
FIG. 7B illustrates a technique for determining a reference signal based at least in part on a reference duration and an ending point of the reference signal according to another example.
Figure 7C:
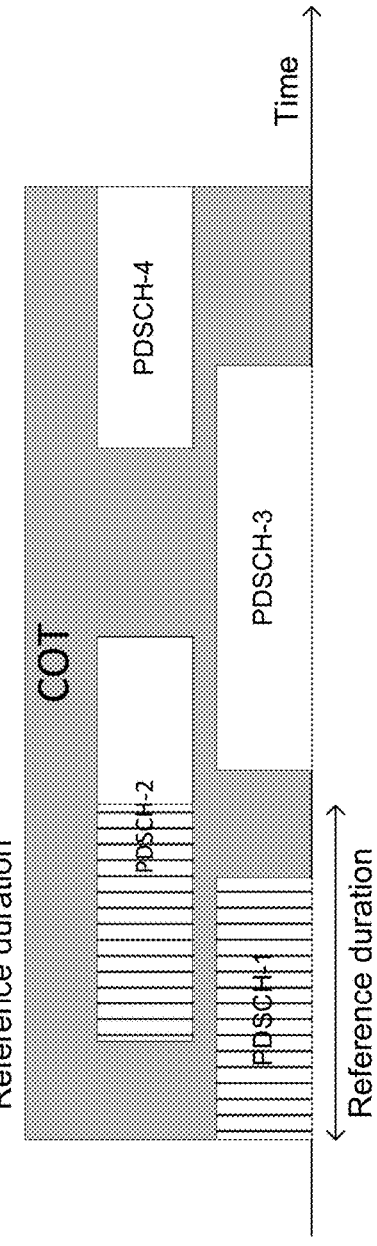
FIG. 7C illustrates a technique for determining a reference signal based at least in part on a reference duration, a starting point of the reference signal, and an ending point of the reference signal according to another example.

The base station may identify reference a PDSCH(s) as the PDSCH transmission(s) that start within an identified RD at the start of the COT. The base station may identify the reference PDSCH(s) as the PDSCH transmission(s) that end within an identified RD at the start of the COT. The base station may identify a reference transmission based on CBGs that are within, or that at least partially overlap, the RD. The base station may identify the reference PDSCH(s) as all of the PDSCH transmissions whose PDCCH was sent within the RD. FIG. 7A illustrates an example in which any PDSCH transmissions that starts within an identified RD at the start of the COT may be considered for a CW update, e.g., may be used as a reference PDSCH transmission. PDSCH-1 and PDSCH-2 are both used as reference PDSCH transmissions because both transmissions start within the RD. FIG. 7B illustrates an example in which the PDSCH transmissions that end within an identified RD at the start of the COT may be used as the reference PDSCH transmissions. PDSCH-1 is used as a reference PDSCH, but PDSCH-2 is not considered a reference PDSCH because PDSCH-2 does not end in the RD. FIG. 7C illustrates an example in which the PDSCH CBGs that are within/overlap the RD may be used as reference transmissions. PDSCH-1 may be used as a reference PDSCH in entirety, whereas the CBGs of PDSCH-2 that are within the RD may be used as reference CBGs to determine the CW update.

Component 520 may also determine a reference transmission directly, e.g., based on 526, without first determining an RD, as with 528. For example, a base station may determine that one or more PDSCH transmissions is a reference PDSCH based on PDCCHs corresponding to the PDSCHs. The PDSCHs, whose PDCCHs are sent within a predetermined time (e.g., the first X ms in the first slot) or a predetermined number of symbols (e.g., first X symbols of first slot of COT), may be used as reference PDSCHs and considered for a CW update. The application of this technique to an example is further illustrated with reference to FIG. 10. A CW Adjustment Component 534 receives a reference transmission 524, explicit feedback 536 and/or implicit feedback 538 and based thereon determines whether to adjust a CW size 542 for future LBT processes. The LBT process may comprise a Cat-4 LBT process, for example. Explicit feedback 536 and/or implicit feedback 538 may relate to whether a determined reference transmission was successfully received by a receiving node.

Reference Duration Determination when Reference Transmission is Punctured

Figure 8A:
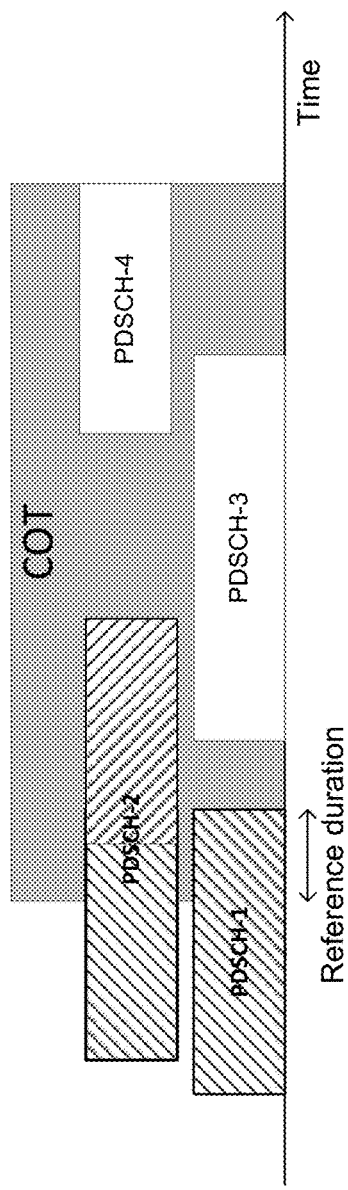
FIG. 8A illustrates a technique for determining reference duration when PDSCH is punctured according to one example.

Although aspects are described using the example of a base station, this is merely illustrative of the concept. Aspects may be similarly applied by a UE. As an example, when PDSCH puncturing is performed at beginning of COT, the base station may need to include additional slots in the RD so that additional PDSCH transmissions may be considered. According to a first example, the base station may determine not to include additional slots or PDSCH when CBG based feedback is available at least for one non-punctured CBG. FIG. 8A illustrates this case, where both PDSCH-1 and PDSCH-2 are punctured. Whereas PDSCH-1 does not have any non-punctured CBGs, PDSCH-2 has at least one CBG that is not punctured. In this case, the CW update may be determined using an RD that does not consider any other PDSCHs and/or additional slots.

Figure 8B:
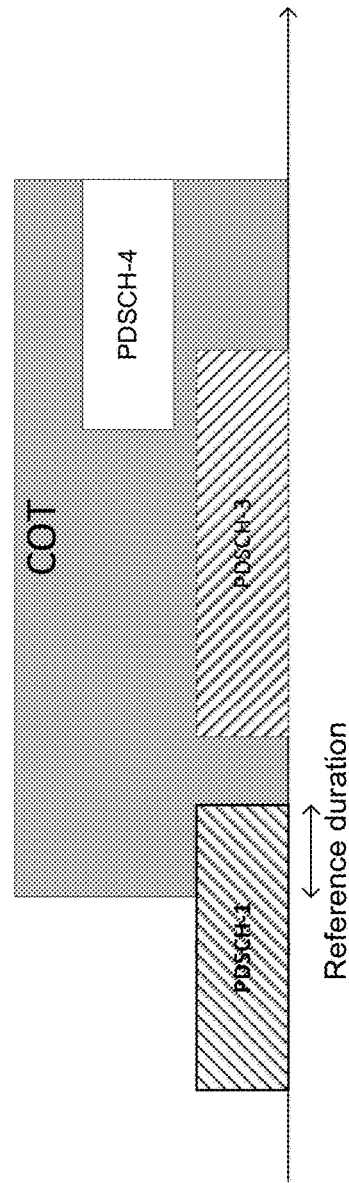
FIG. 8B illustrates a technique for determining reference duration when PDSCH is punctured according to another example.

When the CBG based feedback is not available, the base station may include additional slot(s) or PDSCH(s) or CBG(s) in determining a CW update. FIG. 8B illustrates this case, where the additional PDSCH-3 is considered for the RD determination because PDSCH-1 does not provide any CBG feedback. The additional PDSCH may be a full PDSCH or a partial PDSCH (e.g., a first CBG of an additional PDSCH). According to a second example, when puncturing occurs during an RD or for a reference transmission, the base station may extend the RD and/or consider additional transmissions, e.g., including additional PDSCHs or additional slots, independent of whether CBG feedback is available.

In some implementations, the base station may determine an RD and/or a reference transmission based on whether PDSCH is broadcast without feedback. For example, the base station may determine the RD and/or determine reference transmission(s) without considering broadcast PDSCH (e.g., system information or paging) with no ACK/NACK feedback. The base station may consider subsequent slots with PDSCH transmissions that have available ACK/NACK feedback. When a first slot of a COT includes broadcast PDSCH, e.g., without including unicast PDSCH, the base station may extend the RD to include the PDSCHs transmitted in a subsequent slot. When a first slot of a COT includes both broadcast PDSCH and unicast PDSCH, the base station may consider the unicast PDSCH for the RD determination, e.g., and may disregard the broadcast PDSCH when determining the RD. In one example, the base station may use a message two (MSG2) or a random access procedure as a reference transmission. For example, the base station may consider whether a message 3 (MSG3) is received from the UE in response to the MSG2 transmission from the base station. A MSG2 may comprise, e.g., a random access response (RAR) that is transmitted from the base station to the UE in response to a first random access message from the UE. The first random access message from the UE may comprise, e.g., a random access preamble to initiate a random access procedure. Thus, the MSG3 from the UE may be considered to correspond to positive feedback (e.g., similar to an ACK) from the UE in response to the MSG2 random access message. Thus a MSG2 PDSCH/PDCCH may be used to determine an RD or a reference PDSCH when the MSG3 is considered for the CW update. In one example, the MSG3 may be considered for the CW update when the communication between the base station and UE includes contention free random access.

Determining Reference Duration with Sub-Band Punctured Reference Transmission

Although aspects are described using the example of a base station, this is merely illustrative of the concept. Aspects may be similarly applied by a UE. As an example, when a first slot is partially punctured in time, the reference slot can be determined based on the partial slot and a next full slot when the next full slot is sent in a same TxOP. In some communication, puncturing may occur in both a time domain and a frequency domain. For example, NR-U can have carriers with multiple LBT subbands, e.g., in contrast to LTE. Thus, in NR-U, the puncturing might occur on some subbands and might not occur on other subbands. For example, a base station may prepare a PDSCH to span three subbands (e.g., SB1, SB2, SB3), and subbands SB1 and SB3 pass LBT whereas SB2 does not. The base station then punctures a portion of the PDSCH in SB2 and transmits on SB1 and SB3. A CW update for the SB1 and SB3 based on ACK/NACK for this punctured PDSCH in SB2 can thus be pessimistic.

Due to a processing timeline, the puncturing in frequency may also span more than one slot in the time domain. Unlike time domain puncturing, where there may be a single partial slot, with frequency domain puncturing, there may be more than one partial slot (e.g., multiple partial slots). There may also be cases when a partial slot contains a PDSCH (or a CBG of a punctured PDSCH) that is not punctured. For example, some PDSCHs may be limited to SB1 or SB3, but other PDSCHs may span multiple subbands.

Some CBGs are not Punctured and CBG Level Feedback is Available to Base Station

Figures 9A, 9B:
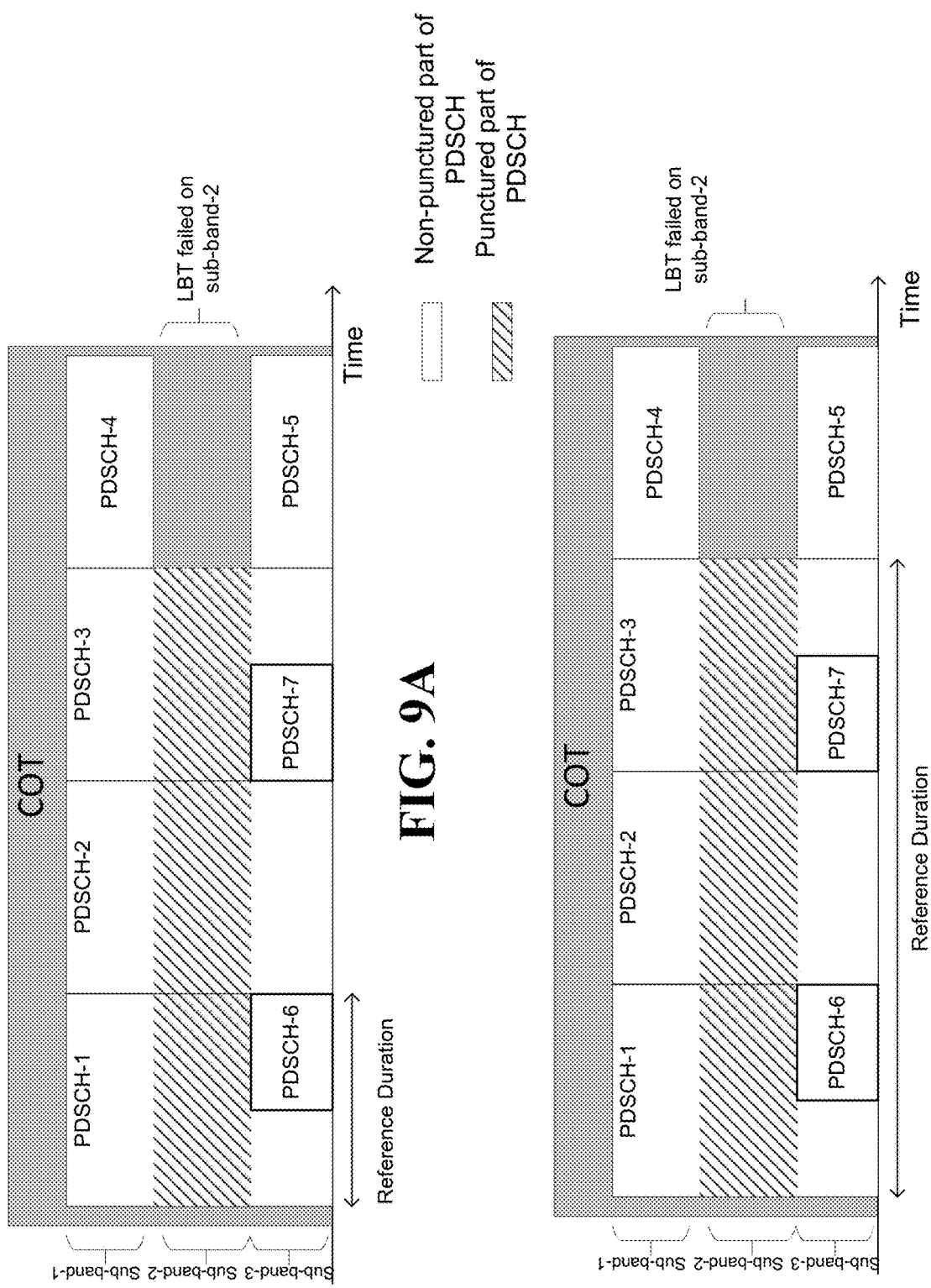
FIG. 9A illustrates a technique for determining reference duration when PDSCH is sub-band punctured according to one example.
FIG. 9B illustrates a technique for determining reference duration when PDSCH is sub-band punctured according to another example.

According to some aspects, when there is at least one PDSCH that is not punctured (or a CBG whose feedback is available), the base station may determine an RD 506 based at least in part on the partial slot without additional slots. FIG. 9A illustrates an example in which the partial slot may be used as the RD 506. Although PDSCH-1 is punctured, PDSCH-6 is not punctured, and the RD may be based on a first slot, as shown. In some implementations, the base station may not consider the punctured PDSCH or the punctured CBGs in determining the CW adjustment.

According to some aspects, when there is at least one PDSCH that is punctured, the base station may determine the RD 506 based at least in part on the partial slot and the next N slots until the end of a transmission opportunity (TxOP) is reached, where N being an integer number. Thus, N slots may indicate a number, N, of slots following the partial slot. FIG. 9B illustrate this case, where the RD includes additional slots beyond the slots comprising PDSCH-1, PDSCH-2, and PDSCH-3, because each of those PDSCH are punctured in subband 2. The base station may extend the RD to include the additional slots until the RD includes a slot in which no PDSCHs are punctured. For example, in FIG. 9B, the slots are added to the partial slot until a slot is reach where PDSCH-4 and PDSCH-5 are not punctured because these specific PDSCH transmissions are sent on sub-bands 1 and 3, respectively, thereby avoiding sub-band 2 that failed the LBT. In one example, N may be a fixed number. The number of slots to consider after a partial slot for the CW adjustment may also be a function of SCS. For example, with a SCS of 15 kHz or 30 kHz, the base station may include one additional slot. With a SCS of 60 kHz, the SCS base station may include more than one additional slot, e.g., two additional slots.

In a second example, the duration, e.g., the number of slots N, may be dynamic or variable. For example, additional slots after the partial slot may be considered until a non-punctured slot is determined or until the end of a TxOP is reached.

In one implementation, a non-punctured slot may be a slot where all of the PDSCHs are not punctured, e.g., a slot without a punctured PDSCH. In a second implementation, a non-punctured slot may be a slot where at least one PDSCH is not punctured. In a third implementation, a non-punctured slot may be a slot where at least one PDSCH CBG is not punctured.

When there are multiple partial slots with punctured PDSCH and a full, non-punctured slot, the base station may determine the RD 506 based on a full non-punctured slot and all the partial slots. Alternatively, when there are multiple partial slots with punctured PDSCH and a full non-punctured slot, the base station may determine the RD 506 based on a full non-punctured slot and one partial slot. The partial slot may be selected as a first partial slot of the COT or a partial slot preceding or immediately preceding the full non-punctured slot.

In certain aspects, the base station may maintain a separate CW for each LBT subband. When the PDSCH is punctured in some subbands, but sent on other subbands, the base station may determine an RD 506 or reference transmission (e.g., reference PDSCH) 524 independently for each subband. For each subband, the base station may determine the reference PDSCH as a full PDSCH (e.g., non-punctured PDSCH) or one or more CBGs of PDSCH(s) that are not punctured. When the PDSCH is punctured in some subbands, but sent on other subbands, the base station may determine an RD 506 that is common across multiple subbands. For example, the base station may continue to increase the RD 506 until each subband has at least one PDSCH or CBG of PDSCH that is not punctured.

CW Update or Adjustment for UL Centric TxOP

Some of the techniques for CW update described above may be applied to a TxOP that includes at least one DL transmission. As described in connection with FIG. 12, the base station may update the CW based at least in part on a downlink transmission during the RD. However, there are situations where a TxOP does not include any DL transmissions, referred to as an UL centric TxOP. Techniques are now described to handle CW update for UL centric TxOPs.

In one example, the base station may use the success or failure of the PUSCHs, whose PDCCHs are transmitted within a reference slot of COT, to determine a CW update. For the case when the TxOP includes UL grants, the base station may employ the techniques described previously with reference to FIGS. 5, 6A and 6B to determine the RD and also to determine which reference transmissions (e.g., which reference PUSCHs) to consider for the CW update.

The base station may determine the RD based on units of slots using the techniques described previously with reference to FIGS. 5 and 6A. Instead of considering the SCS of the PDSCH, the base station may consider the SCS of the PDCCHs that schedule the PUSCH transmissions. For techniques 509-511, the base station may determine the RD as a function of a minimum SCS, e.g., for the PDCCH, that is supported by the base station or a minimum SCS that is actually used by the base station to transmit the PDCCH at a beginning of a COT.

The base station may determine the RD based on sub-slot scheduling techniques described previously. For example, the techniques 515 for determining the symbol based RD may be applied equally herein. Instead of determining which PDSCH ends earliest, the sub-slot scheduling technique may determine RD based on which PDCCH ends earliest.

Figure 10:
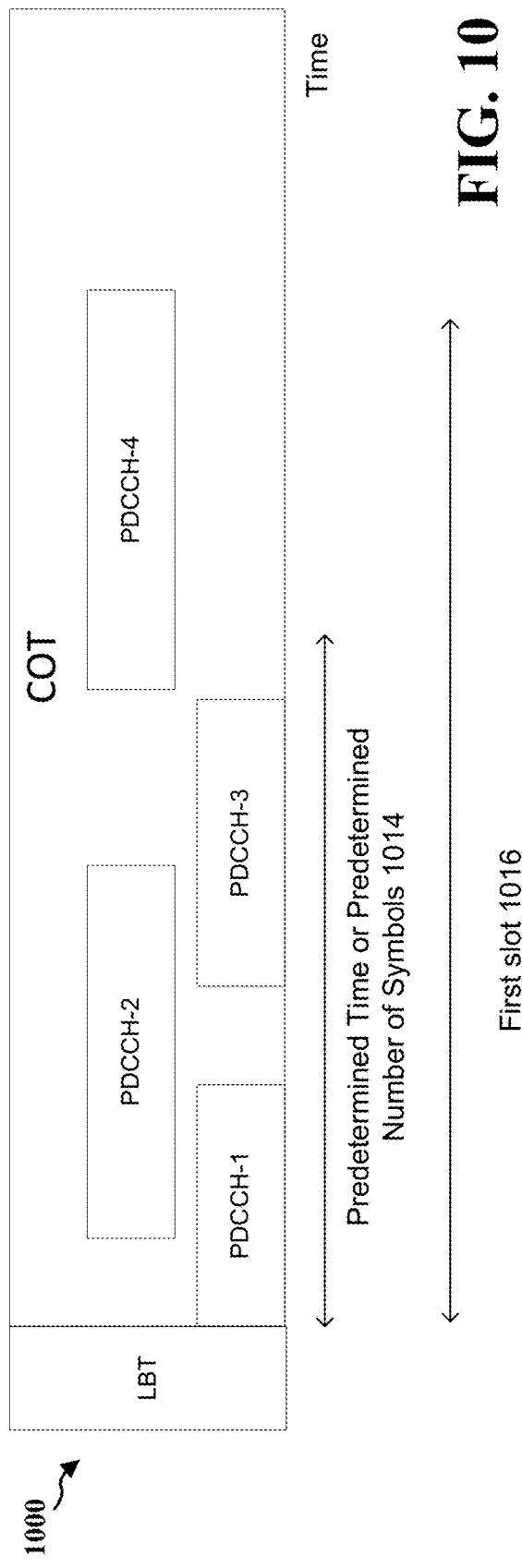
FIG. 10 illustrates one or more reference signals determined directly from a predetermined time or predetermined number of symbols in a first slot according to one example.

In another example, the base station may determine the RD and/or a reference transmission based on PDCCH. For example, the base station may determine RD based on PUSCH transmissions, whose PDCCH is sent within a first predetermined timefrom the beginning of COT (e.g., X ms) or a predetermined number of symbols (e.g., X symbols) in a first slot of the COT. FIG. 10 illustrates an example 1000 of a predetermined time/number of symbols 1014 in a first slot 1016 of the COT. In an example, the base station may determine the reference PUSCH directly, e.g., rather than determining the reference duration.

The base station may determine a reference PUSCH by including each PUSCH transmission whose PDCCH was sent within an RD. Any of the previously described techniques to determine a reference transmission may also be applied in combination to directly determine a reference PUSCH or to determine a reference PUSCH based on a determined RD or other factor.

Figures 12, 13:
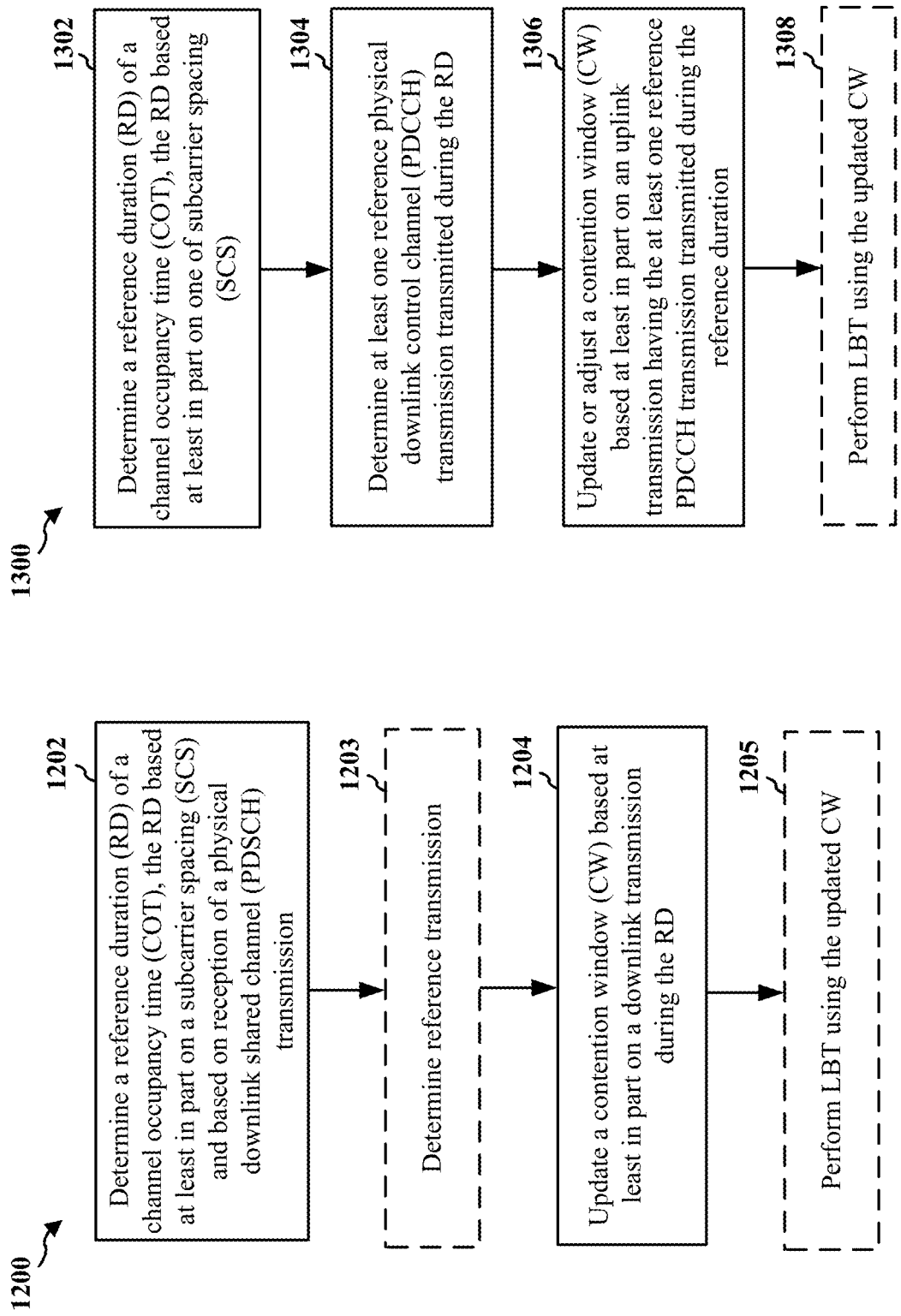
FIG. 12 is a flowchart of a method of wireless communication according to a first example.
FIG. 13 is a flowchart of a method of wireless communication according to a second example.

FIG. 13 shows an example method for a base station to determine at least one PDCCH transmission transmitted during the RD. The base station updates a CW based at least in part on an uplink transmission having the PDCCH transmission transmitted during the RD.

TxOP with Both DL and UL

According to one example, the base station may schedule DL and UL transmissions in a TxOP, and the base station may perform a CW update based on ACK/NACK feedback for the DL transmissions while ignoring the success or failure of the UL transmissions. Application of this technique may be based on the beginning of a COT including at least one DL transmission.

Due to broadcast transmissions, e.g., in NR-U, it is possible that a beginning portion of COT may not contain any DL transmissions which have corresponding ACK/NACK feedback. Thus, in certain aspects, the UL transmissions and/or the DL transmissions may be used to update the CW size when a COT contains both UL and DL transmissions. For example, a base station may consider the ACK/NACK feedback for the DL transmissions when an early portion of a COT includes DL transmissions that can be used for the CW update. Otherwise, the base station may determine its CW update based on the UL transmissions while ignoring the DL transmissions. According to a second technique, the base station may consider both ACK/NACK feedback of the DL transmissions and the success/failure of the UL transmissions to update or adjust the CW size.

FIG. 14 illustrates an example method of CW adjustment or update in which the base station determines whether to use a reference PDSCH transmission or a reference PUSCH transmission for updating the CW size. The base station may determine to use a PDSCH transmission without using a PUSCH transmission to update the CW when the PDSCH has associated feedback and is transmitted during a period of time from the beginning of the COT. The base station may determine to use the PUSCH transmission without using the PDSCH transmission to update the CW when no PDSCH having associated feedback is transmitted during the period of time from the beginning of the COT. In another example, the base station may use both a PDSCH transmission and a PUSCH transmission to update its CW.

FIG. 12 is a flowchart 1200 of a method of wireless communication. In one example, the method may be performed by a base station or a component of a base station (e.g., base station 102, 180, 310, apparatus 1602, 1602'; the processing system 1714, which may include the memory 376 and which may be the entire base station 310 or a component of the base station 310, such as the TX processor 316, the RX processor 370, and/or the controller/processor 375). In another example, the method may be performed by a UE or a component of a UE (e.g., UE 104, 350, apparatus 1602, 1602'; the processing system 1714, which may include the memory 360 and which may be the entire UE 350 or a component of the UE 350, such as the TX processor 368, the RX processor 356, and/or the controller/processor 359). Optional aspects are illustrated with a dashed line.

At 1202, the device determines an RD of a COT, the RD being based at least in part on an SCS and based on reception of a physical downlink shared channel (PDSCH) transmission. The determination may be performed, e.g., by the reference duration determination component 1612 of apparatus 1602. Examples of such an RD determination are described, e.g., in connection with FIGS. 6A and 6B. The reference duration may be determined based on a minimum SCS supported by the base station. The reference duration may be determined based on a minimum SCS used by the device at a beginning of the COT. The device may determine a first reference duration for a first SCS and a second reference duration for a second SCS, and wherein the device updates the CW based on a first shared channel transmission based on the first SCS during the first duration and a second downlink transmission based on the second SCS during the second duration. If the method is performed by a base station, the shared channel transmission may comprise PDSCH. If the method is performed by a UE, the shared channel transmission may comprise PUSCH. The reference duration may be determined based on a maximum of: a predefined minimum duration; a minimum SCS supported by the device, or the minimum SCS used by the device at a beginning of the COT.

The reference duration of the COT may be determined based on a number of slots, e.g., as described in connection with FIG. 6A. The reference duration of the COT may be determined based on a number of symbols, e.g., as described in connection with FIG. 6B.

The COT may include a first slot having a plurality of symbols, and the reference duration of the COT may be determined based on the number of symbols of a PDSCH transmission transmitted during the first slot of the COT. As an example, the reference duration may be determined based on the PDSCH transmission having an earliest end symbol in the first slot of the COT. The reference duration may be determined based on the PDSCH transmission having an earliest starting symbol in the first slot of the COT or having a PDCCH transmitted in the earliest symbol in the first slot of the COT. The reference duration may be determined based on the PDSCH transmission starting within a predetermined number of symbols or a predetermined time from a beginning of the first slot of the COT or based on the PDSCH having a PDCCH that starts within the predetermined number of symbols or the predetermined time from the beginning of the first slot of the COT.

A first reference duration may be determined for a first SCS used in the first slot of the COT and a second reference duration may be determined for a second SCS used in the first slot of the COT. The reference duration may be determined based on the number of symbols of a first CBG of a PDSCH transmission transmitted during the COT.

The reference duration may be determined based on at least one of whether CBG based feedback is available for at least one non-punctured CBG of the shared channel transmission when puncturing is performed at a beginning of the COT, wherein the reference duration is extended when the CBG based feedback is not available for the at least one non-punctured CBG.

The determination of the reference duration, at 1202, may include extending the reference duration when the shared channel transmission is punctured during the reference duration.

The reference duration or the reference PDSCH may be determined based on whether the shared channel transmission comprises a broadcast without feedback. The CW may be updated based on the determined reference PDSCH transmission. The reference duration may be extended to include the shared channel transmission having feedback. The reference PDSCH may be defined based on the PDSCH occurring during the reference duration and having feedback.

The reference duration may be determined further based on whether at least one non-punctured PDSCH transmission or at least one non-punctured CBG is transmitted during the reference duration. For example, the reference duration may be extended when no non-punctured PDSCH or non-punctured CBG is transmitted during the reference duration.

The reference duration may be determined further based on whether the shared channel transmission is punctured during the reference duration, wherein the reference duration may be extended a number of slots when the shared channel transmission is punctured during the reference duration. The reference duration may be extended to an end of the shared channel transmission by the base station. The number of slots may comprise a predetermined number of slots. The number of slots may be based on at least one of a non-punctured slot for the shared channel transmission or an end of the shared channel transmission. The non-punctured slot may comprise at least one of: a first slot where all PDSCH transmissions are not punctured, a second slot where at least one PDSCH transmission is not punctured, and/or a third slot where at least one PDSCH CBG is not punctured. The reference duration may be extended to include multiple slots comprising punctured shared channel transmissions and a slot comprising at least one PDSCH transmission or CBG that is not punctured. Multiple slots may comprise punctured shared channel transmissions, and the reference duration may be determined to include a slot comprising at least one PDSCH transmission or CBG that is not punctured and at least one of the multiple slots comprising punctured shared channel transmissions. The reference duration may be determined for each subband. The reference duration may be determined in common for multiple subbands.

At 1204, the device updates a CW based at least in part on reception of the PDSCH transmission during the reference duration. The update may be performed, e.g., by the CW adjustment component 1616 of apparatus 1602. Updating the CW may include one of doubling the CW based at least in part on a negative acknowledgement received by the device for the shared channel transmission or assigning the CW with a predetermined minimum value (CW_min) based at least in part on a positive acknowledgement received by the device for the shared channel transmission. Updating the CW may include doubling the CW based at least in part on no acknowledgement received by the device for the shared channel transmission.

As illustrated at 1203, the device may also determine reference PDSCH transmission(s) based on a relationship of the reference duration to the reference PDSCH transmission or to a PDCCH transmission for the reference PDSCH transmission. The determination may be performed, e.g., by the reference transmission determination component 1614 of apparatus 1602. The CW may be updated, e.g., at 1204, based on the determined reference PDSCH transmission. The reference PDSCH transmission(s) may be determined based on the PDCCH transmission associated with the at least one reference PDSCH transmission being transmitted within a predetermined amount of time or a predetermined number of symbols from a start of the COT. The reference PDSCH transmission(s) may be determined based on at least one of: the PDSCH(s) starting within the reference duration of the COT; the PDSCH(s) ending within the reference duration of the COT; CBG(s) of the PDSCH(s) that at least partially overlap the reference duration; and/or the PDSCH(s) having the PDCCH transmitted within the reference duration.

As illustrated at 1205, the device may use the updated CW, as determined at 1204, to perform LBT, e.g., in order to transmit shared channel communication to a UE. The LBT may be performed, e.g., by the reception component 1604 of apparatus 1602. The communication between the device and the UE may be performed on a shared spectrum or an unlicensed spectrum. For example, the communication may be based on NR-U.

FIG. 13 is a flowchart 1300 of a method of wireless communication. The method may be performed by a base station or a component of a base station (e.g., base station 102, 180, 310, apparatus 1602, 1602'; the processing system 1714, which may include the memory 376 and which may be the entire base station 310 or a component of the base station 310, such as the TX processor 316, the RX processor 370, and/or the controller/processor 375). Optional aspects are illustrated with a dashed line.

At 1302, the base station determines an RD of a COT, the RD being based at least in part on a SCS. The RS may be determined, e.g., by the reference duration determination component 1612 of apparatus 1602. The reference duration may be determined based on at least one of: a predefined minimum duration, a minimum SCS supported by the base station, and/or the minimum SCS used by the base station for a PDCCH at a beginning of the COT. The reference duration of the COT may be determined based on a number of slots. The reference duration of the COT may be determined based on a number of symbols. The COT may include a first slot having a plurality of symbols, and the reference duration of the COT may be determined based on a the number of symbols of a PDCCH transmission transmitted during the COT. The reference duration may be determined based on the reference PDCCH transmission having at least one of an earliest end symbol in the first slot of the COT and/or an earliest starting symbol in the first slot of the COT. The reference duration may be determined based on the reference PDCCH transmission starting within a predetermined number of symbols or a predetermined time from a beginning of the COT.

A first reference duration may be determined for a first SCS used for a first PDCCH in the COT and a second reference duration may be determined for a second SCS used for a second PDCCH in the COT.

The reference duration may be determined for each subband. The reference duration may be determined in common for multiple subbands.

At 1304, the base station determines reference PDCCH transmission(s) that are transmitted during the reference duration. The reference PDCCH transmission(s) may be determined, e.g., by the reference transmission determination component 1614 of apparatus 1602. An example of reference transmission(s) being determined based on PDCCH is described in connection with FIG. 10.

At 1306, the base station may update a CW based at least in part on an uplink transmission having the at least one reference PDCCH transmission transmitted during the reference duration. The CW may be updated, e.g., by the CW adjustment component 1616 of apparatus 1602. Updating the CW may include one of doubling the CW based at least in part on a negative acknowledgement received by the base station for the downlink transmission or assigning the CW with a predetermined minimum value based at least in part on a positive acknowledgement received by the base station for the downlink transmission. Updating the CW may include doubling the CW based at least in part on no acknowledgement received by the base station for the downlink transmission. The CW may be updated based on each uplink transmission having a PDCCH transmission transmitted during the reference duration. The CW may be updated based on each uplink transmission having a PDCCH transmission transmitted within a predetermined amount of time or a predetermined number of symbols from a start of the COT.

As illustrated at 1308, the base station may use the updated CW, as determined at 1306, to perform LBT, e.g., in order to transmit downlink communication to a UE. The LBT may be performed, e.g., by reception component 1604 of apparatus 1602. The communication between the base station and the UE may be performed on a shared spectrum or an unlicensed spectrum. For example, the communication may be based on NR-U.

FIG. 14 is a flowchart 1400 of a method of wireless communication. The method may be performed by a base station or a component of a base station (e.g., base station 102, 180, 310, apparatus 1602, 1602'; the processing system 1714, which may include the memory 376 and which may be the entire base station 310 or a component of the base station 310, such as the TX processor 316, the RX processor 370, and/or the controller/processor 375). Optional aspects are illustrated with a dashed line.

As illustrated at 1402, the base station determines a reference duration of a COT. The determination may include aspects, e.g., as described in connection with the determinations for either of 1202 or 1302. The determination may be performed, e.g., by the reference duration determination component 1612 of apparatus 1602.

At 1404, the base station determines whether to use a reference PDSCH transmission or a reference PUSCH transmission for updating a CW. The determination may be performed, e.g., by the reference transmission determination component 1614 of apparatus 1602. For example, the base station may determine to use a PDSCH transmission without using a PUSCH transmission to update the CW when the PDSCH has associated feedback and is transmitted during a period of time from the beginning of the COT. The base station may determine to use the PUSCH transmission without using the PDSCH transmission to update the CW when no PDSCH having associated feedback is transmitted during the period of time from the beginning of the COT.

The base station may determine to use both a PDSCH transmission and a PUSCH transmission to update the CW.

At 1406, the base station updates the CW based on at least one of the PDSCH or the PUSCH and the reference duration. The CW may be updated, e.g., by the CW adjustment component 1616 of apparatus 1602. Updating the CW may include one of doubling the CW based at least in part on a negative acknowledgement received by the base station for the downlink transmission or assigning the CW with a predetermined minimum value based at least in part on a positive acknowledgement received by the base station for the downlink transmission. Updating the CW may include doubling the CW based at least in part on no acknowledgement received by the base station for the downlink transmission.

As illustrated at 1408, the base station may use the updated CW, as determined at 1406, to perform LBT, e.g., in order to transmit downlink communication to a UE. The LBT may be performed, e.g., by the reception component 1604 of apparatus 1602. The communication between the base station and the UE may be performed on a shared spectrum or an unlicensed spectrum. For example, the communication may be based on NR-U.

Figure 16:
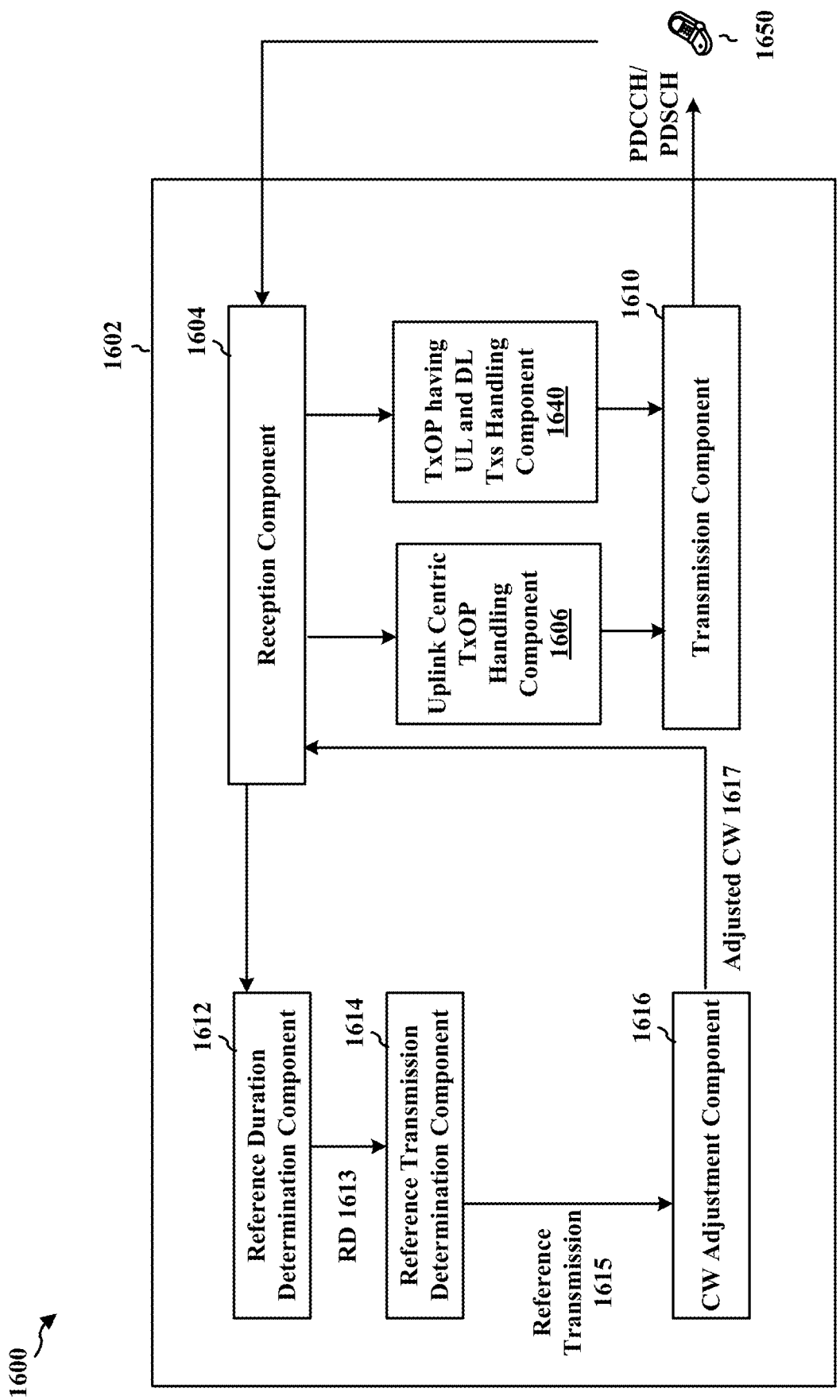
FIG. 16 is a data flow diagram illustrating the data flow between different means/components in an example apparatus.

FIG. 16 is a conceptual data flow diagram 1600 illustrating the data flow between different means/components in an example apparatus 1602. The apparatus 1602 may be a base station or a component of a base station, e.g., in communication with a UE, e.g., device 1650. In some aspects, the apparatus may comprise a UE or a component of a UE. The apparatus may include a reception component 1604 configured to receive communication from the device 1650 and a transmission component 1610 configured to transmit communication to the device. The apparatus may use LBT prior to transmitting to the device, for example. The apparatus 1602 may include a RD Determination Component 1612 configured to determine an RD duration such as described in connection with any of 1202, 1302, 1402; a Reference Transmission Determination Component 1614 configured to determine a reference transmission as described in connection with any of 1203, 1304, 1404; and a CW Size Adjustment Component 1615 that determines whether to update a CW and/or generates an adjusted CW 1617 based on a reference transmission 1615 or RD 1613, e.g., as described in connection with any of 1204, 1306, 1406. Components 1612, 1614, and 1616 execute one of more techniques described above with reference to FIGS. 4, 5, and 12.

The apparatus 1602 may include additional components that perform each of the blocks of the algorithm in the aforementioned flowcharts of FIGS. 4, 12-14. As such, each block in the aforementioned flowcharts of FIGS. 4, 12-14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 17:
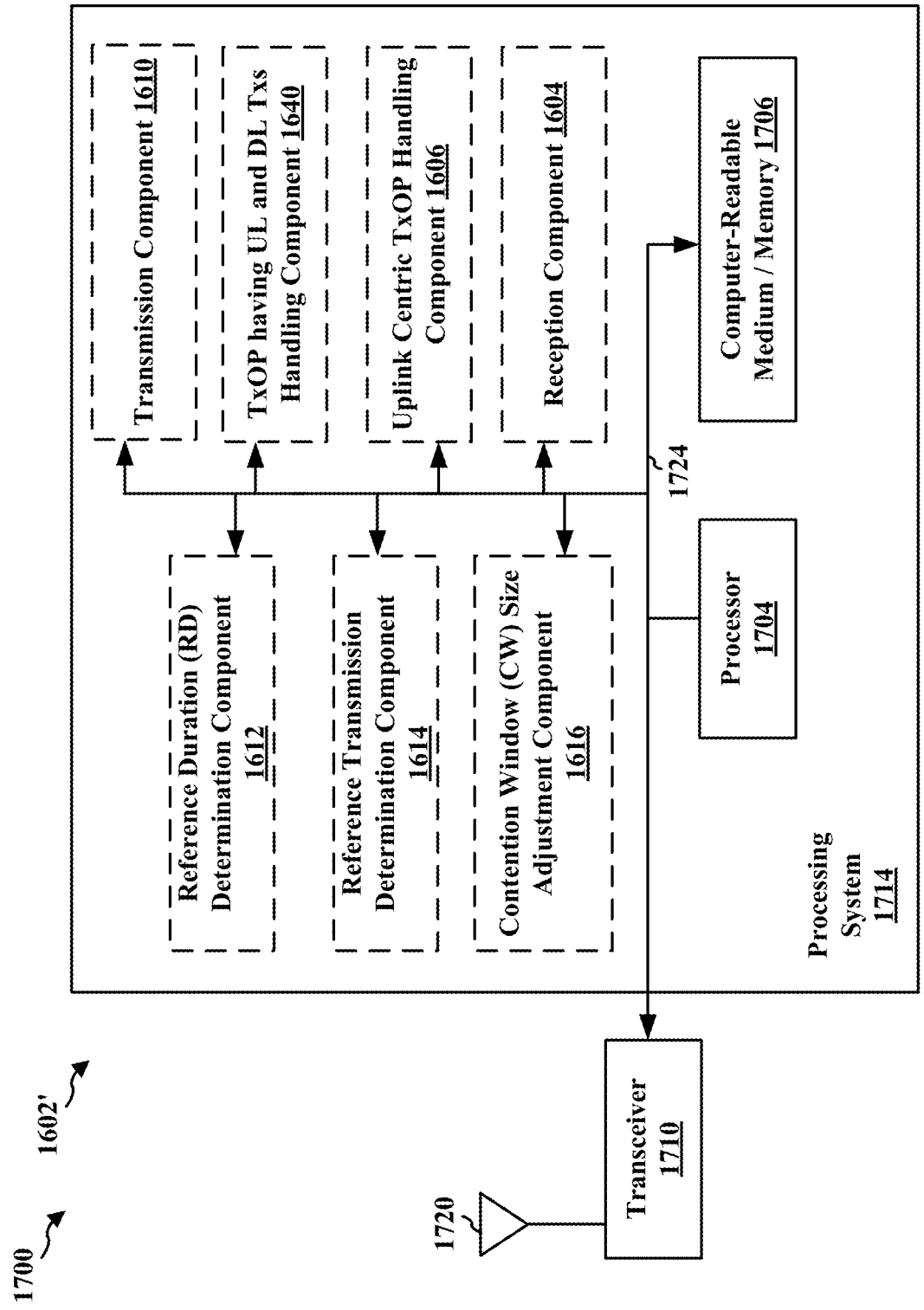
FIG. 17 is a diagram illustrating an example of a hardware implementation for an apparatus employing a processing system.

FIG. 17 is a diagram 1700 illustrating an example of a hardware implementation for an apparatus 1602' employing a processing system 1714. The processing system 1704 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware components, represented by the processor 1704, the components 1604, 1606, 1610, 1612, 1614, 1616, 1640, and the computer-readable medium/memory 1706. The bus 1724 may also link various other circuits such as timing sources, peripherals, voltage regulators, and power management circuits, which are well known in the art, and therefore, will not be described any further.

The processing system 1714 includes an RD Determination Component 1612, a Reference Transmission Determination Component 1614, and a CW Size Adjustment Component 1616. Components 1612, 1614, 1616 execute one of more techniques described above with reference to FIGS. 4, 5, and 12.

The processing system 1714 also includes TxOP having an UL and DL Txs Handling Component 1640 for executing the techniques described above in connection with FIG. 14, an Uplink Centric TxOP Handling Component 1606 for executing the techniques described above in connection with FIG. 13, and a CW Adjustment Component 1616 for executing the techniques described above in connection with FIG. 15.

The processing system 1714 may be coupled to a transceiver 1710. The transceiver 1710 is coupled to one or more antennas 1720. The transceiver 1710 provides a means for communicating with various other apparatus over a transmission medium. The transceiver 1710 receives a signal from the one or more antennas 1720, extracts information from the received signal, and provides the extracted information to the processing system 1714. In addition, the transceiver 1710 receives information from the processing system 1714, and based on the received information, generates a signal to be applied to the one or more antennas 1720. The processing system 1714 includes a processor 1704 coupled to a computer-readable medium/memory 1706. The processor 1704 is responsible for general processing, including the execution of software stored on the computer-readable medium/memory 1706. The software, when executed by the processor 1704, causes the processing system 1714 to perform the various functions described previously for any particular apparatus. The computer-readable medium/memory 1706 may also be used for storing data that is manipulated by the processor 1704 when executing software. The processing system 1714 further includes at least one of the components 1604, 1606, 1610, 1612, 1614, 1616, 1640. The components may be software components running in the processor 1704, resident/stored in the computer readable medium/memory 1706, one or more hardware components coupled to the processor 1704, or some combination thereof.

In one configuration, the apparatus 1602 for wireless communication is a base station that includes means for determining RD, means for determining a reference transmission, and means to adjust CW, means for handling UL centric TxOP, and means for handling TxOP with both UL and DL, and means for performing LBT based on an updated CW. The aforementioned means may be one or more of the aforementioned components of the apparatus 1602' and/or the processing system 1714 of the apparatus 1602' configured to perform the functions recited by the aforementioned means. As described *supra*, the processing system 1714 may include the TX Processor 316, 368, the RX Processor 356, 370, and the controller/processor 359, 375. As such, in one configuration, the aforementioned means may be the TX Processor 316, 368, the RX Processor 356, 370, and the controller/processor 359, 375 configured to perform the functions recited by the aforementioned means.

UL CW Update

Figure 11:
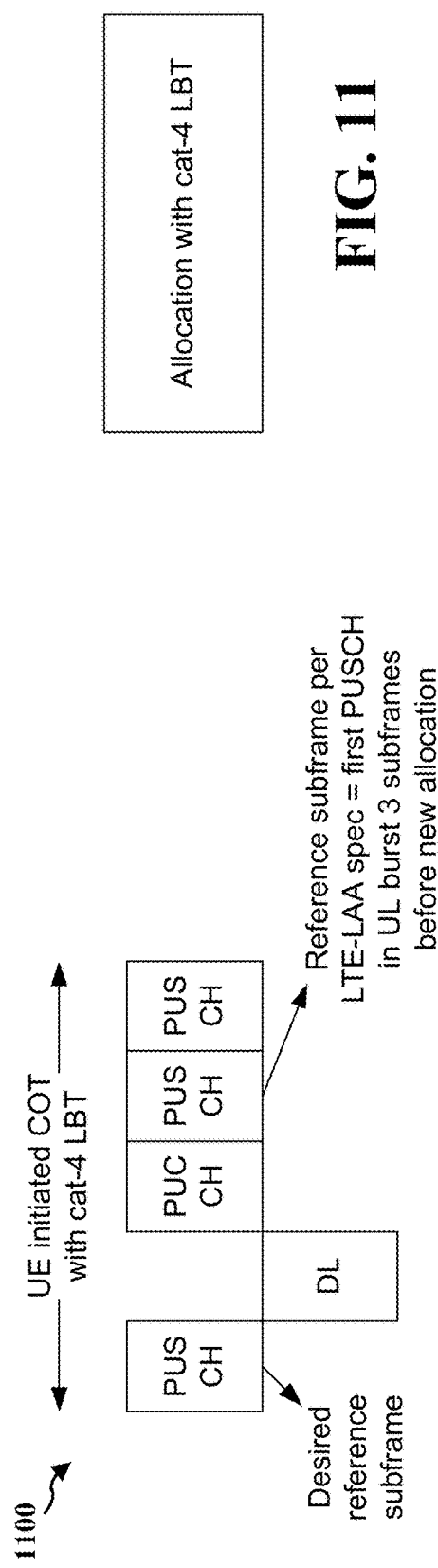
FIG. 11 illustrates a UE initiated COT with a category four listen before talk (LBT) to which a UE-side CW size adjustment technique according to one example may be applied.

A UE side CW window update may include if the UE receives an uplink grant in a subframe, a reference subframe may be based on a most recent subframe before subframe in which the uplink grant was received (or a number of subframes prior to the subframe in which the uplink grant is received) and in which the UE has transmitted an uplink transmission, e.g., an uplink shared transmission using a Type 1 channel access procedure. For example, if the UE transmits uplink transmissions, e.g., uplink shared channel transmissions without gaps, the reference subframe may be the first subframe of the contiguous transmission. Thus, a first slot of a last uplink burst may be used to determine a CW update. However, there may be multiple switching points. FIG. 11 illustrates an example 1100 in which a UE may transmit PUSCH, switch to receiving a downlink transmission from the base station, and switch back to uplink transmissions. FIG. 11 illustrates that a UE may transmit PUCCH before returning to transmitting PUSCH. If a first subframe of contiguous PUSCH transmission is used for a reference subframe, the PUSCH that is considered for the CW will not be the PUSCH at the beginning of the COT.

Thus, rather than basing the reference subframe on uplink shared channel transmissions without gaps, the reference subframe may be based on a first PUSCH in a COT. In FIG. 11, this would lead to use of the first PUSCH, prior to the switch to downlink reception, for the reference subframe for updating the CW.

Thus, when DL transmissions occur early in the COT and are the source of ACK/NACK information of the COT, the UE may update CW based on whether a downlink transmission (e.g., PDCCH or PDSCH) during the COT is successfully received (e.g., double CW upon failure, and reset CW to a minimum value upon success).

In another example, the UE may update the CW based on downlink reception in a UE initiated COT. Thus, the downlink reception illustrated in FIG. 11 between PUSCH and PUCCH may be used to update the CW by the UE. The UE may use downlink reception, e.g., when the downlink reception is within a period of time from the beginning of the COT and/or when the downlink reception is the source of feedback of the COT. For example, if the PDCCH and/or the PDSCH is successfully received at the UE, the UE may reset the CW to a minimum value. If the PDCCH/PDSCH is not successfully received, the UE may increase (e.g., double) the CW size.

FIG. 15 is a flowchart 1500 of a method of wireless communication. The method may be performed by a UE or a component of a UE (e.g., UE 104, 350, apparatus 1802, 1802'; the processing system 1914, which may include the memory 360 and which may be the entire UE 350 or a component of the UE 350, such as the TX processor 368, the RX processor 356, and/or the controller/processor 359). Optional aspects are illustrated with a dashed line.

At 1502, the UE determines an RD of a COT based on a first slot of a most recent set of uplink shared channel transmissions during the COT. The determination may be performed, e.g., by the reference duration determination component 1812 of apparatus 1802. The most recent set of the uplink shared channel transmissions may include non-contiguous uplink shared channel transmissions, e.g., as described in connection with FIG. 11.

At 1504, the UE updates a CW based at least in part on the uplink shared channel transmission during the reference duration. The determination may be performed, e.g., by the reference transmission determination component 1814 of apparatus 1802. The CW may be updated further based on a downlink transmission during the COT.

As illustrated at 1506, the UE may use the updated CW, as determined at 1504, to perform LBT, e.g., in order to transmit downlink communication to a UE. The LBT may be performed, e.g., by the reception component 1804 and/or transmission component 1810 of apparatus 1802. The communication between the base station and the UE may be performed on a shared spectrum or an unlicensed spectrum. For example, the communication may be based on NR-U.

Figure 18:
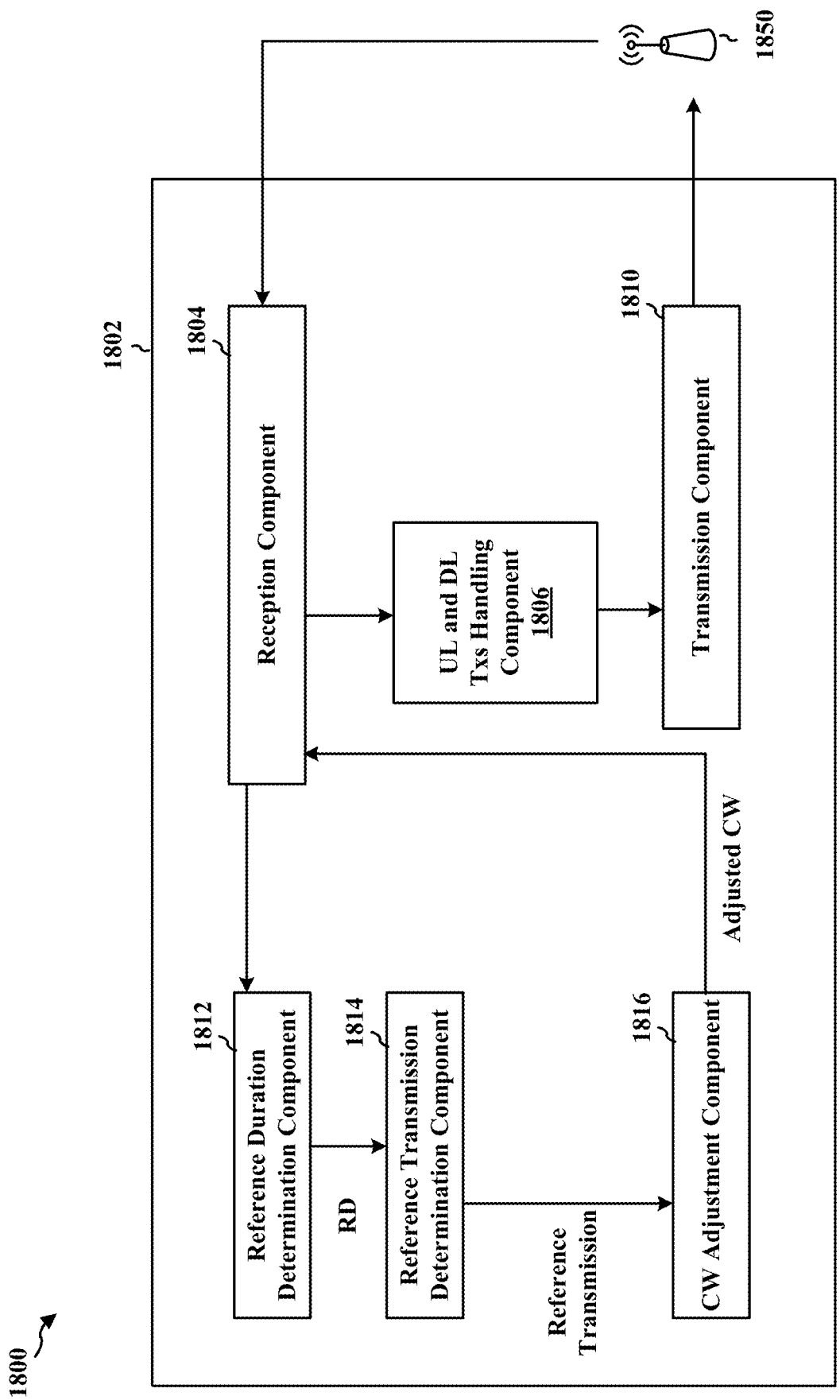
FIG. 18 is a data flow diagram illustrating the data flow between different means/components in an example apparatus.

FIG. 18 is a conceptual data flow diagram 1800 illustrating the data flow between different means/components in an example apparatus 1802. The apparatus may be a UE or a component of a UE in communication with a base station 1850. The apparatus may comprise a reception component configured to receive downlink communication from base station 1850. The apparatus may include a transmission component configured to transmit uplink communication to the base station. The apparatus includes a reference duration determination component 1812 configured to determine a reference duration of a COT, the reference duration being based on a first slot of a most recent set of uplink shared channel transmissions during the COT, e.g., as described in connection with 1502 in FIG. 15. The apparatus includes a reference transmission determination component 1814 configured to determine a reference transmission, e.g., as described in connection with FIG. 15. For example, the apparatus may include an UL and DL transmission handling component 1806 configured to assist in the determination of the reference communication, e.g., whether uplink and/or downlink. The apparatus includes a CW adjustment component 1816 configured to update the CW based at least in part on the uplink shared channel transmission during the reference duration, e.g., as described in connection with 1506 in FIG. 15.

The apparatus may include additional components that perform each of the blocks of the algorithm in the aforementioned flowcharts of FIGS. 4 and 15. As such, each block in the aforementioned flowcharts of FIGS. 4 and 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 19:
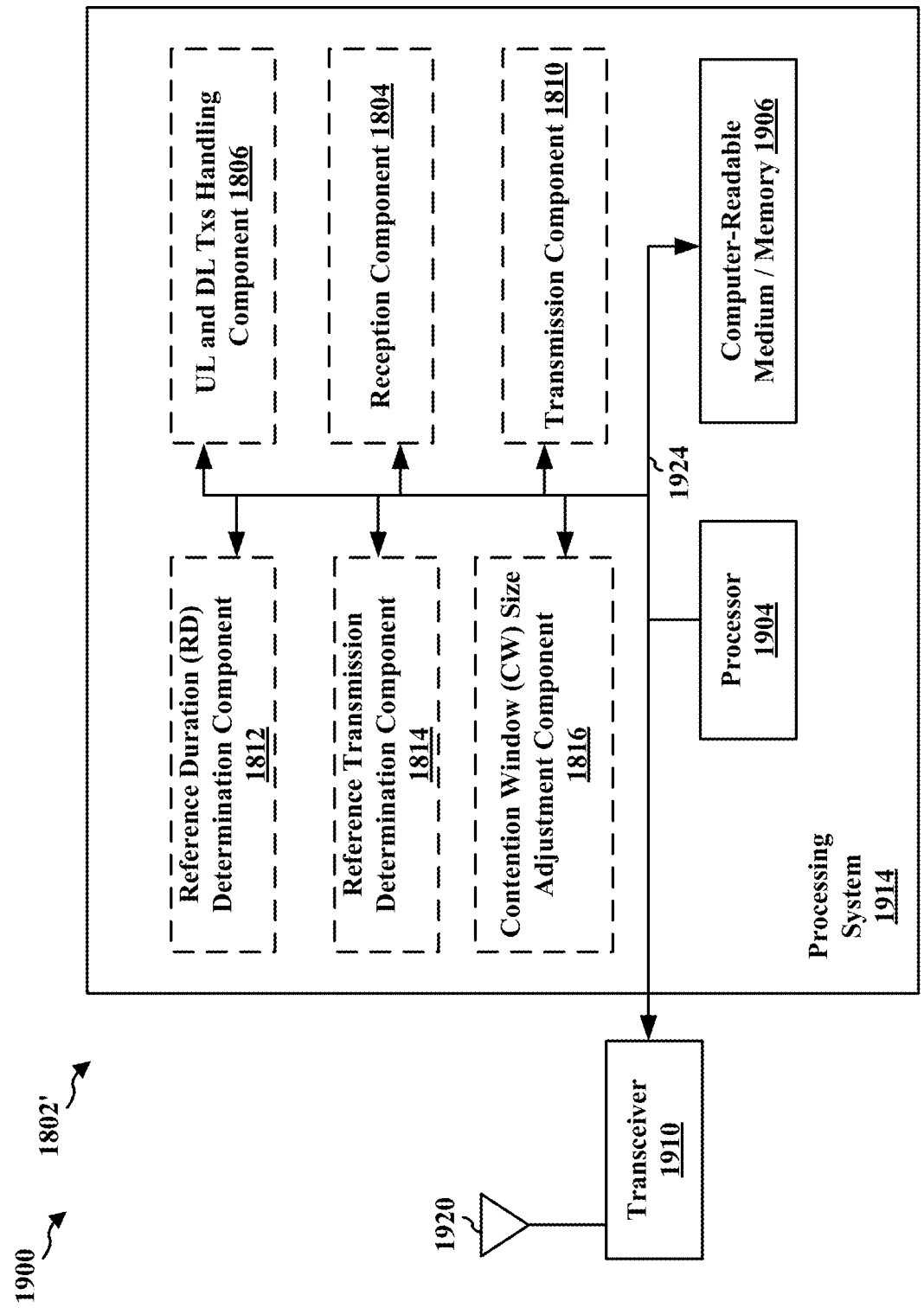
FIG. 19 is a diagram illustrating an example of a hardware implementation for an apparatus employing a processing system.

FIG. 19 is a diagram 1900 illustrating an example of a hardware implementation for an apparatus 1802' employing a processing system 1914. The processing system 1914 may be implemented with a bus architecture, represented generally by the bus 1924. The bus 1924 may include any number of interconnecting buses and bridges depending on the specific application of the processing system 1914 and the overall design constraints. The bus 1924 links together various circuits including one or more processors and/or hardware components, represented by the processor 1904, the components 1804, 1806, 1810, 1812, 1814, 1816, and the computer-readable medium/memory 1906. The bus 1924 may also link various other circuits such as timing sources, peripherals, voltage regulators, and power management circuits, which are well known in the art, and therefore, will not be described any further.

The processing system 1914 may be coupled to a transceiver 1910. The transceiver 1910 is coupled to one or more antennas 1920. The transceiver 1910 provides a means for communicating with various other apparatus over a transmission medium. The transceiver 1910 receives a signal from the one or more antennas 1920, extracts information from the received signal, and provides the extracted information to the processing system 1914, specifically the reception component 1804. In addition, the transceiver 1910 receives information from the processing system 1914, specifically the transmission component 1810, and based on the received information, generates a signal to be applied to the one or more antennas 1920. The processing system 1914 includes a processor 1904 coupled to a computer-readable medium/memory 1906. The processor 1904 is responsible for general processing, including the execution of software stored on the computer-readable medium/memory 1906. The software, when executed by the processor 1904, causes the processing system 1914 to perform the various functions described supra for any particular apparatus. The computer-readable medium/memory 1906 may also be used for storing data that is manipulated by the processor 1904 when executing software. The processing system 1914 further includes at least one of the components 1804, 1806, 1810, 1812, 1814, 1816. The components may be software components running in the processor 1904, resident/stored in the computer readable medium/memory 1906, one or more hardware components coupled to the processor 1904, or some combination thereof. The processing system 1914 may be a component of the base station 310 and may include the memory 376 and/or at least one of the TX processor 316, the RX processor 370, and the controller/processor 375. Alternatively, the processing system 1914 may be the entire base station (e.g., see 310 of FIG. 3).

In one configuration, the apparatus 1802/1802' for wireless communication includes means for determining a reference duration of a COT, the reference duration being based on a first slot of a most recent set of uplink shared channel transmissions during the COT and means for updating a CW based at least in part on the uplink shared channel transmission during the reference duration. The aforementioned means may be one or more of the aforementioned components of the apparatus 1802 and/or the processing system 1914 of the apparatus 1802' configured to perform the functions recited by the aforementioned means. As described supra, the processing system 1914 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Techniques for determining reference transmissions for contention window update, e.g., for NR-U have been described. Although these techniques have been described in the context of 5G NR, these techniques may also be applicable to other multi-access technologies and the telecommunication standards that employ these technologies.

The following examples are illustrative only and may be combined with aspects of other embodiments or teachings described herein, without limitation.

Example 1 is an apparatus for wireless communication at a wireless device, comprising: a memory; and at least one processor coupled to the memory, the memory and the at least one processor configured to: determine a reference duration of a COT, the reference duration based at least in part on a SCS and based on reception of a PDSCH transmission; and update a CW based at least in part on reception of the PDSCH transmission during the reference duration.

In Example 2, the apparatus of Example 1 further includes that the PDSCH transmission is a non-punctured PDSCH transmission.

In Example 3, the apparatus of Example 1 or Example 2 further includes that the reference duration comprises a non-punctured slot including the PDSCH transmission or an end of the PDSCH transmission.

In Example 4, the apparatus of any of Examples 1-3 further includes that the reference duration is determined further based on whether the PDSCH transmission is punctured during the reference duration and the reference duration is extended a number of slots when the PDSCH transmission is punctured during the reference duration.

In Example 5, the apparatus of any of Examples 1-4 further includes that the reference duration is extended to an end of a shared channel transmission by a base station or a pre-determined number of slots.

In Example 6, the apparatus of any of Examples 1-5 further includes that the reference duration is determined based on the PDSCH transmission starting within a predetermined number of symbols or a predetermined time from a beginning of a slot.

In Example 7, the apparatus of any of Examples 1-6 further includes that updating the CW includes one of increasing the CW based at least in part on a negative acknowledgement received by the wireless device for the PDSCH transmission or assigning the CW with a predetermined minimum value (CW_min) based at least in part on a positive acknowledgement received by the wireless device for the PDSCH transmission.

In Example 8, the apparatus of any of Examples 1-7 further includes that updating the CW includes increasing the CW based at least in part on no acknowledgement being received by the wireless device for the PDSCH transmission.

In Example 9, the apparatus of any of Examples 1-8 further includes that the wireless device determines a first reference duration for a first SCS and a second reference duration for a second SCS, and wherein the wireless device updates the CW based on a first shared channel transmission based on the first SCS during the first reference duration and a second shared channel transmission based on the second SCS during the second reference duration.

In Example 10, the apparatus of any of Examples 1-9 further includes that the memory and the at least one processor is further configured to: determine at least one reference PDSCH transmission based on a control channel transmission for the at least one reference PDSCH transmission being transmitted within a predetermined amount of time or a predetermined number of symbols from a start of the COT.

In Example 11, the apparatus of any of Examples 1-10 further includes that the at least one reference PDSCH transmission is determined based on at least one of: the at least one reference PDSCH transmission starting within the reference duration; the at least one reference PDSCH transmission ending within the reference duration; at least one code block group (CBG) of the at least one reference PDSCH transmission that at least partially overlap the reference duration; or the at least one reference PDSCH transmission having the control channel transmission within the reference duration.

In Example 12, the apparatus of any of Examples 1-11 further includes that the reference duration or a reference PDSCH transmission is determined based on whether the PDSCH transmission comprises a broadcast without feedback, wherein the CW is updated based on the reference PDSCH transmission determined by the wireless device.

In Example 13, the apparatus of any of Examples 1-12 further includes that the reference duration is extended to include the PDSCH transmission having the feedback.

In Example 14, the apparatus of any of Examples 1-13 further includes that the reference duration is determined further based on whether at least one non-punctured code block group (CBG) is transmitted during the reference duration, and wherein the reference duration is extended when no non-punctured shared channel transmission or no non-punctured CBG is transmitted during the reference duration.

In Example 15, the apparatus of any of Examples 1-14 further includes that the reference duration is based on a non-punctured slot comprises at least one of: a first slot where all shared channel transmissions are not punctured, a second slot comprises at least one non-punctured shared channel transmission, or a third slot where at least one shared channel CBG is not punctured.

In Example 16, the apparatus of any of Examples 1-15 further includes that the reference duration is extended to include multiple slots comprises punctured shared channel transmissions and a slot comprises at least one non-punctured shared channel transmission or non-punctured CBG.

In Example 17, the apparatus of any of Examples 1-16 further includes that multiple slots comprise punctured transmissions, and wherein the reference duration is determined to include a slot comprises at least one non-punctured shared channel transmission or non-punctured CBG and at least one of the multiple slots comprises punctured downlink transmissions.

Example 18 is an apparatus for wireless communication at a wireless device, comprises: means for determining a reference duration of a COT, the reference duration based at least in part on a SCS and based on reception of a PDSCH transmission; and means for updating a CW based at least in part on reception of the PDSCH transmission during the reference duration.

In Example 19, the apparatus of Example 18 further comprises means to perform the method (or method by the apparatus) of any of Examples 2-17.

Example 20 is a method for wireless communication at a wireless device, comprising: performing the method (or method by the apparatus) of any Examples 1-17.

Example 21 is a computer-readable medium storing computer executable code for wireless communication at a wireless device, the code when executed by a processor cause the processor to perform the method (or method by the apparatus) of any of Examples 1-17.

Example 22 is an apparatus for wireless communication by a wireless device at a base station, comprising: a memory; and at least one processor coupled to the memory, the memory and the at least one processor configured to: determine a reference duration of a COT, the reference duration being based at least in part on a SCS; determine at least one reference PDCCH transmission transmitted during the reference duration; and updating a CW based at least in part on an uplink transmission having the at least one reference PDCCH transmission transmitted during the reference duration.

In Example 23, the apparatus of Example 22 further includes that the reference duration is determined based on at least one of: a predefined minimum duration, a minimum SCS supported by the base station, or the minimum SCS used by the base station for a PDCCH at a beginning of the COT.

In Example 24, the apparatus of Example 22 or Example 23 further includes that the reference duration is determined based on a number of slots or a number of symbols.

In Example 25, the apparatus of any of Examples 22-24 further includes that the COT includes a first slot having a plurality of symbols, and wherein the reference duration is determined based on a the number of symbols of a PDCCH transmission transmitted during the COT.

In Example 26, the apparatus of any of Examples 22-25 further includes that the reference duration is determined based on the at least one reference PDCCH transmission having at least one of: an earliest end symbol in the first slot of the COT, or an earliest starting symbol in the first slot of the COT.

In Example 27, the apparatus of any of Examples 22-26 further includes that the reference duration is determined based on the at least one reference PDCCH transmission starting within a predetermined number of symbols or a predetermined time from a beginning of the COT.

In Example 28, the apparatus of any of Examples 22-27 further includes that a first reference duration is determined for a first SCS used for a first PDCCH in the COT and a second reference duration is determined for a second SCS used for a second PDCCH in the COT.

In Example 29, the apparatus of any of Examples 22-28 further includes that the CW is updated based on each uplink transmission having a PDCCH transmission transmitted during the reference duration.

In Example 30, the apparatus of any of Examples 22-29 further includes that the CW is updated based on each uplink transmission having a PDCCH transmission transmitted within a predetermined amount of time or a predetermined number of symbols from a start of the COT.

In Example 31, the apparatus of any of Examples 22-30 further includes that the reference duration is determined for each subband or the reference duration is determined in common for multiple subbands.

Example 32 is an apparatus for wireless communication at a base station, comprises: means for determining a reference duration of a COT, the reference duration being based at least in part on a SCS; determining at least one reference PDCCH transmission transmitted during the reference duration; and means for updating a CW based at least in part on an uplink transmission having the at least one reference PDCCH transmission transmitted during the reference duration.

In Example 33, the apparatus of Example 32 further comprises means to perform the method (or method by the apparatus) of any of Examples 23-31.

Example 34 is a method for wireless communication at a base station, comprising: performing the method (or method by the apparatus) of any Examples 22-31.

Example 35 is a computer-readable medium storing computer executable code for wireless communication at a base station, the code when executed by a processor cause the processor to perform the method (or method by the apparatus) of any of Examples 22-31.

Example 36 is an apparatus for wireless communication at a base station, comprising: a memory; and at least one processor coupled to the memory, the memory and the at least one processor configured to: determine a reference duration of a COT; determining whether to use a reference PDSCH transmission or a reference PUSCH transmission for updating a CW; and update the CW based on at least one of the reference PDSCH transmission or the reference PUSCH transmission and the reference duration.

In Example 37, the apparatus of Example 36 further includes that the base station determines to use a PDSCH transmission without using a PUSCH transmission to update the CW when the PDSCH transmission has associated feedback and is transmitted during a period of time from a beginning of the COT.

Example 38 is an apparatus for wireless communication at a base station, comprises: means for determining a reference duration of a COT; means for determining whether to use a reference PDSCH transmission or a reference PUSCH transmission for updating a CW; and means for updating the CW based on at least one of the reference PDSCH transmission or the reference PUSCH transmission and the reference duration.

Example 40 is a computer-readable medium storing computer executable code for wireless communication at a base station, the code when executed by a processor cause the processor to determine a reference duration of a COT; determine whether to use a reference PDSCH transmission or a reference PUSCH transmission for updating a CW; and update the CW based on at least one of the reference PDSCH transmission or the reference PUSCH transmission and the reference duration.

Example 41 is an apparatus for wireless communication at a UE, comprising: a memory; and at least one processor coupled to the memory, the memory and the at least one processor configured to: determine a reference duration of a COT, the reference duration being based on a first slot of a most recent set of uplink shared channel transmissions during the COT; and update a CW based at least in part on an uplink shared channel transmission during the reference duration.

Example 42 is an apparatus for wireless communication at a UE, comprises: means for determining a reference duration of a COT, the reference duration being based on a first slot of a most recent set of uplink shared channel transmissions during the COT; and means for updating a CW based at least in part on an uplink shared channel transmission during the reference duration.

Example 43 is a computer-readable medium storing computer executable code for wireless communication at a UE, the code when executed by a processor cause the processor to determine a reference duration of a COT, the reference duration being based on a first slot of a most recent set of uplink shared channel transmissions during the COT; and update a CW based at least in part on an uplink shared channel transmission during the reference duration.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication at a wireless device, comprising:
    a memory; and
    at least one processor coupled to the memory, the memory and the at least one processor configured to:
        determine a reference duration of a channel occupancy time (COT) for each subband of at least one subband, the reference duration being based at least in part on a subcarrier spacing (SCS) and based on reception of a physical downlink shared channel (PDSCH) transmission that is non-punctured in a corresponding subband; and
        update a contention window (CW) based at least in part on reception of the PDSCH transmission during the reference duration.

2. The apparatus of claim 1, wherein the reference duration comprises a slot including the non-punctured PDSCH transmission or an end of the non-punctured PDSCH transmission.

3. The apparatus of claim 2, wherein the reference duration is determined further based on whether the PDSCH transmission is punctured during the reference duration and the reference duration is extended a number of slots when the PDSCH transmission is punctured during the reference duration.

4. The apparatus of claim 3, wherein the reference duration is extended to an end of a shared channel transmission by a base station or a pre-determined number of slots.

5. The apparatus of claim 1, wherein the reference duration is determined based on the PDSCH transmission starting within a predetermined number of symbols or a predetermined time from a beginning of a slot.

6. The apparatus of claim 1, wherein updating the CW includes one of increasing the CW based at least in part on a negative acknowledgement received by the wireless device for the PDSCH transmission or assigning the CW with a predetermined minimum value (CW_min) based at least in part on a positive acknowledgement received by the wireless device for the PDSCH transmission.

7. The apparatus of claim 1, wherein updating the CW includes increasing the CW based at least in part on no acknowledgement being received by the wireless device for the PDSCH transmission.

8. The apparatus of claim 1, wherein the wireless device determines a first reference duration for a first SCS and a second reference duration for a second SCS, and wherein the wireless device updates the CW based on a first shared channel transmission based on the first SCS during the first reference duration and a second shared channel transmission based on the second SCS during the second reference duration.

9. The apparatus of claim 1, wherein the memory and the at least one processor is further configured to:
determine at least one reference PDSCH transmission based on a control channel transmission for the at least one reference PDSCH transmission being transmitted within a predetermined amount of time or a predetermined number of symbols from a start of the COT.

10. The apparatus of claim 9, wherein the at least one reference PDSCH transmission is determined based on at least one of:
the at least one reference PDSCH transmission starting within the reference duration;
the at least one reference PDSCH transmission ending within the reference duration;
at least one code block group (CBG) of the at least one reference PDSCH transmission that at least partially overlap the reference duration; or
the at least one reference PDSCH transmission having the control channel transmission within the reference duration.

11. The apparatus of claim 1, wherein the reference duration or a reference PDSCH transmission is determined based on whether the PDSCH transmission comprises a broadcast without feedback, wherein the CW is updated based on the reference PDSCH transmission determined by the wireless device.

12. The apparatus of claim 11, wherein the reference duration is extended to include the PDSCH transmission having the feedback.

13. The apparatus of claim 1, wherein the reference duration is determined further based on whether at least one non-punctured code block group (CBG) is transmitted during the reference duration, and wherein the reference duration is extended when no non-punctured shared channel transmission or no non-punctured CBG is transmitted during the reference duration.

14. The apparatus of claim 1, wherein the reference duration is based on a non-punctured slot comprising at least one of:
a first slot where all shared channel transmissions are not punctured,
a second slot comprising at least one non-punctured shared channel transmission, or
a third slot where at least one shared channel CBG is not punctured.

15. The apparatus of claim 1, wherein the reference duration is extended to include multiple slots comprising punctured shared channel transmissions and a slot comprising at least one non-punctured shared channel transmission or non-punctured CBG.

16. The apparatus of claim 1, wherein multiple slots comprise punctured transmissions, and wherein the reference duration is determined to include a slot comprising at least one non-punctured shared channel transmission or non-punctured CBG and at least one of the multiple slots comprising punctured downlink transmissions.

17. An apparatus for wireless communication by a wireless device at a base station, comprising:
a memory; and
at least one processor coupled to the memory, the memory and the at least one processor configured to:
determine a reference duration of a channel occupancy time (COT) for each subband of at least one subband, the reference duration being based at least in part on a subcarrier spacing (SCS), wherein the COT includes a first slot having a plurality of symbols, and wherein the reference duration is determined based on a number of symbols of a physical downlink control channel (PDCCH) transmission transmitted during the COT;
determine at least one reference PDCCH transmission transmitted during the reference duration; and
update a contention window (CW) based at least in part on an uplink transmission granted by the at least one reference PDCCH transmission transmitted during the reference duration.

18. The apparatus of claim 17, wherein the reference duration is determined based on at least one of:
a predefined minimum duration,
a minimum SCS supported by the base station, or
the minimum SCS used by the base station for a PDCCH at a beginning of the COT.

19. The apparatus of claim 17, wherein the reference duration is determined based on the at least one reference PDCCH transmission having at least one of:
an earliest end symbol in the first slot of the COT, or
an earliest starting symbol in the first slot of the COT.

20. The apparatus of claim 19, wherein the reference duration is determined based on the at least one reference PDCCH transmission starting within a predetermined number of symbols or a predetermined time from a beginning of the COT.

21. The apparatus of claim 19, wherein a first reference duration is determined for a first SCS used for a first PDCCH in the COT and a second reference duration is determined for a second SCS used for a second PDCCH in the COT.

22. The apparatus of claim 17, wherein the CW is updated based on each uplink transmission granted by the PDCCH transmission transmitted during the reference duration.

23. The apparatus of claim 17, wherein the CW is updated based on each uplink transmission granted by the PDCCH transmission transmitted within a predetermined amount of time or a predetermined number of symbols from a start of the COT.

24. An apparatus for wireless communication at a base station, comprising:
a memory; and
at least one processor coupled to the memory, the memory and the at least one processor configured to:
determine, for each subband of at least one subband, a reference duration of a channel occupancy time (COT);
determine whether to use a reference physical downlink shared channel (PDSCH) transmission or a reference physical uplink shared channel (PUSCH) transmission for updating a contention window (CW), wherein the reference duration or the reference PDSCH transmission is determined based on whether a PDSCH transmission comprises a broadcast without feedback; and updating the CW based on at least one of the reference PDSCH transmission or the reference PUSCH transmission and the reference duration.

25. The apparatus of claim 24, wherein the base station determines to use the PDSCH transmission without using a PUSCH transmission to update the CW when the PDSCH transmission has an associated feedback and is transmitted during a period of time from a beginning of the COT.

26. An apparatus for wireless communication at a user equipment (UE), comprising:
  a memory; and
  at least one processor coupled to the memory, the memory and the at least one processor configured to:
    determine, for each subband of at least one subband, a reference duration of a channel occupancy time (COT), wherein the reference duration is determined based on whether at least one non-punctured code block group (CBG) is transmitted during the reference duration, and wherein the reference duration is extended when no non-punctured shared channel transmission or no non-punctured CBG is transmitted during the reference duration; and
    update a contention window (CW) based at least in part on an uplink shared channel transmission during the reference duration.

* * * * *